US008583912B2

(12) United States Patent
Ishikawa et al.

(10) Patent No.: US 8,583,912 B2
(45) Date of Patent: Nov. 12, 2013

(54) COMMUNICATION SYSTEM OF CLIENT TERMINALS AND RELAY SERVER AND COMMUNICATION METHOD

(75) Inventors: Yuichi Ishikawa, Tokyo (JP); Toshio Koide, Tokyo (JP)

(73) Assignee: NEC Corporation, Tokyo (JP)

( * ) Notice: Subject to any disclaimer, the term of this patent is extended or adjusted under 35 U.S.C. 154(b) by 1227 days.

(21) Appl. No.: 11/850,899

(22) Filed: Sep. 6, 2007

(65) Prior Publication Data
US 2008/0162929 A1 Jul. 3, 2008

(30) Foreign Application Priority Data
Dec. 27, 2006 (JP) ................................ 2006-350921

(51) Int. Cl.
*H04L 29/06* (2006.01)
(52) U.S. Cl.
USPC ............................ 713/151; 713/168; 380/260
(58) Field of Classification Search
USPC ............................ 713/162, 163, 170; 380/280
See application file for complete search history.

(56) References Cited

U.S. PATENT DOCUMENTS 7,000,248 B2    2/2006 Mizukoshi
2001/0023482 A1*  9/2001 Wray ............................ 713/151
2002/0150097 A1* 10/2002 Yen et al. ...................... 370/390
2006/0031929 A1   2/2006 Saito
2008/0144622 A1*  6/2008 Platnic .......................... 370/390

FOREIGN PATENT DOCUMENTS

JP     2003-32236    1/2003
JP     2006-50191    2/2006

* cited by examiner

*Primary Examiner* — Justin T Darrow
(74) *Attorney, Agent, or Firm* — Young & Thompson

(57) ABSTRACT

In a client terminal of a communication system, a cipher session establishing section establishes a cipher session use connection between the client terminal as a source client terminal and a relay server by transmitting/receiving a cipher session establishment message between the source client terminal and the relay server, and notifies header information contained in a cipher session header to the relay server. A shared key managing section holds a client shared key with a destination client terminal, A data enciphering section performs encipherment of a data and/or MAC (Message Authentication Code) calculation of the data by using the client shared key and to output the performing result as a client cipher data. A message producing section produces a data communication message including a cipher data field in which the client cipher data is inserted and a non-cipher data field in which the cipher session header containing the header information is inserted. A transmitting section transmits the data communication messages destined to the destination client terminal to the relay server by using the cipher session use connection.

15 Claims, 13 Drawing Sheets

COMMUNICATION SYSTEM OF CLIENT TERMINALS AND RELAY SERVER AND COMMUNICATION METHOD

TECHNICAL FIELD

The present invention relates to a communication system for communication via a relay server, and more particularly, to a communication system in which communication between client terminals connected to different private networks is relayed by a relay server connected to a global network.

BACKGROUND ART

Diversified business forms through activation of collaboration across companies and departments in recent years are accompanied by rapidly increasing needs for communication between terminals connected to different corporate LANs or department LANs. More specifically, the needs for communication between terminals connected to different private networks have been increasing. Due to this background, a method of communicating between terminals connected to different private networks has been proposed in recent years.

The communication between the terminals connected to the different private networks is realized by communicating through a relay server provided in a global network. However, the private networks are generally provided with firewalls. Therefore, the communication between the terminals connected to the different private networks is blocked off by the firewalls in many cases.

Generally, the firewall is set to allow a specific TCP (Transmission Control Protocol) communication from the private network to the global network. Here, as the TCP communication used for web browsing communication, there are TCP communication with the destination port of 80, i.e., HTTP (Hypertext Transfer Protocol) communication, and TCP communication with the destination port of 443, i.e., HTTPS (Hypertext Transfer Protocol Layer Security) communication. A TCP connection is initially established from one terminal on a private network to the relay server, to allow two-directional communication between the terminal and the relay server. Then, the terminal transmits a transmission data for a desired transmission destination terminal to the relay server by using the established TCP connection. The relay server transmits the received data onto a TCP connection established for the destination terminal.

As described above, in order to realize the communication between the different private networks, the relay server needs to ensure communication security between the terminals and the relay server. Since the relay server is provided on the global network, communication between the terminals is supposed to pass through the global network. The global network is always exposed to a security risk such as eavesdropping, unlike the private network, and accordingly, communication between the terminal and the relay server needs to be enciphered.

There are mainly known two different techniques to realize communication cipher between the terminal and the relay server. In a first technique, an HTTPS session is established between the terminal and the relay server, in which communication between the terminal and the relay server is carried out on the HTTP session to encipher the communication. More specifically, a shared key is first transferred between the terminal and relay server by SSL (Security Socket Layer) by using the TCP connection established between them. Data to be transmitted to a destination is enciphered in the terminal by use of the shared key transferred from the relay server. The relay server deciphers the enciphered data by use of the shared key, and re-enciphers the deciphered data by use of another shared key transferred when the HTTPS session with a destination terminal is established, to transmit the re-enciphered data to the destination terminal. Such an example of the first technique is SoftEther.

The relay server in the first technique determines the destination terminal based on a destination data described in the transmission data from the transmission source terminal. It should be noted that since the transmission data from the source terminal is enciphered in any way, the relay server needs to decipher the transmission data in order to refer to the destination data of the transmission data and further re-encipher it. In SoftEther, the source terminal encapsulates the transmission data by use of HTTPS in a packet form including layer-2 header information. Then, the source terminal transmits the encapsulated data by use of an HTTPS connection established to the relay server in advance. At this time, the relay server decapsulates the encapsulated data. Since the transmission data has been encapsulated by use of HTTPS, a decapsulating process includes a process of deciphering the enciphered data. Next, the relay server refers to the data extracted through the decapsulation, i.e., the layer-2 header of the packet including the layer-2 header information, and determines the destination terminal from a destination MAC address. After the determination, the relay server encapsulates the extracted data again (i.e., re-enciphers the deciphered data) by use of HTTPS, and transmits the packet including the extracted data to the destination terminal by using a HTTPS connection.

In a second technique, a HTTPS session is directly established between terminals to communicate with each other by use of TCP connection established between each of the terminals and the relay server. The terminal first establishes a TCP connection having the destination port of 443 with the relay server. Then, the TCP connection is used to exchange a shared key with the destination terminal by using SSL. Even when receiving a shared key exchanging message of SSL from the source terminal, the relay server simply transfers the received message to the destination terminal by use of the TCP connection without checking its contents. The terminal enciphers the data to be transmitted by using the shared key exchanged with the with the communication destination, and transmits the enciphered data by using the TCP connections established with the relay server. The relay server does not decrypt or re-encrypt the received data which is transmitted to the TCP connection established with the communication destination without any change. Such an example of the second related technique is described in Japanese Laid Open Patent Application (JP-P2006-50191A). An operation of such a relay server is similar to operation of a Web Proxy server that has been frequently used in the related technique.

The relay server according to the second related technique determines a transfer destination terminal of a received data in connection base on the basis of information in which a TCP connection established between the terminals and the relay server corresponds to a communication destination terminal. Such an example of the second related technique is described in Japanese Laid Open Patent Applications (JP-P2006-50191A and JP-P2003-32236A), and Japanese Patent No. 3637863.

The difference between the first related technique and the second related technique is in that the relay server according to the second related technique only terminates the TCP connection without terminating HTTPS sessions (i.e. without deciphering and enciphering communication between the terminals), as opposed to the relay server according to the first related technique which terminates HTTPS sessions (i.e. decipherment and encipherment communication between the terminals).

The first related technique has a problem that the received data needs to be deciphered and re-enciphered in data transfer by the relay server, and deciphering/enciphering processes load is applied for every transfer.

The relay server according to the second related technique has a process load less than that of the first related technique because the encipherment and deciphering processes are omitted. However, there is a problem that communication via the relay server is not available from a private network terminal provided with highly functional firewalls which carries out a filtering operation by examining its contents in a layer 5 or higher of transfer data. When the highly functional firewall is provided in the private network, communication from the terminal to the relay server is not blocked off until establishing the TCP connection of the destination port of 443, but there is a possibility that the firewall blocks off an SSL message for exchanging the shared key transferred from the relay server to the terminal.

The problem of the second related technique will be described below. An SSL message includes a field called an SSL record header in which a message type is written. The message type includes handshake, change cipher spec, and application data or the like, and handshake and change cipher spec are written as the message type of messages for exchanging the shared keys. The SSL record header itself is not usually enciphered, and its contents can be examined by the firewall. That is, the firewall can check the message type of the SSL record header and a message transmission direction and detect a direction of the SSL sessions. Therefore, it is detected by the firewall that the SSL session is extended from the relay server in the global network to the terminal in the private network, according to the second related technique. The above SSL message is blocked off because the firewall is generally operated under the policies to block off establishment of connections and sessions from the global network to the private networks.

SUMMARY

An exemplary object of the present invention is to reduce a process load of a relay server which relays communication with high secrecy between a plurality of private networks.

In an exemplary aspect of the present inventions a client terminal includes: a cipher session establishing section configured to establish a cipher session use connection between the client terminal as a source client terminal and a relay server by transmitting/receiving a cipher session establishment message between the source client terminal and the relay server, and to notify header information contained in a cipher session header to the relay server; a shared key managing section configured to hold a client shared key with a destination client terminal, a data enciphering section configured to perform encipherment of a data and/or MAC (Message Authentication Code) calculation of the data by using the client shared key and to output the performing result as a client cipher data; a message producing section configured to produce a data communication message including a cipher data field in which the client cipher data is inserted and a non-cipher data field in which the cipher session header containing the header information is inserted; and a transmitting section configured to transfer the data communication messages destined to the destination client terminal to the relay server by using the cipher session use connection.

In another exemplary aspect of the present invention, a relay server which relays communication between client terminals, includes: a cipher session establishing section configured to establish a cipher session use connection with each of a plurality of client terminals by transmitting/receiving a cipher session establishment message to/from each of the plurality of client terminals, and to acquire header information to be contained in a cipher session header from each of the plurality of client terminals; and a message transfer section configured to transmit/receive a data communication message to/from each of the plurality of client terminals by using the cipher session use connection. The data communication message includes a cipher data field which includes a client cipher data enciphered by using a client shared key shared by the plurality of client terminals, and a non-cipher data field which includes a cipher session header which contains the header information. The message transfer section converts the cipher session header contained in the non-cipher data field of the data communication message transmitted from any of the plurality of client terminals into a cipher session header corresponding to one of the plurality of client terminals as a transmission destination of the data communication message and transmits the data communication message which has the converted cipher session header, to the client terminal as the transmission destination.

In another exemplary aspect of the present invention, a communication system includes; a client terminal; a relay server; a private network connected with the client terminal; a global network connected with the relay server; and a firewall provided between the private network and the global network to monitor the cipher session use connection. The client terminal includes: a cipher session establishing section configured to establish a cipher session use connection between the client terminal as a source client terminal and the relay server by transmitting/receiving a cipher session establishment message between the source client terminal and the relay server, and to notify header information contained in a cipher session header to the relay server; a shared key managing section configured to hold a client shared key with a destination client terminal; a data enciphering section configured to perform encipherment of a data and/or MAC (Message Authentication Code) calculation of the data by using the client shared key and to output the performing result as a client cipher data; a message producing section configured to produce a data communication message including a cipher data field in which the client cipher data is inserted and a non-cipher data field in which the cipher session header containing the header information is inserted; and a transmitting section configured to transfer the data communication messages destined to the destination client terminal to the relay server by using the cipher session use connection. The relay server includes: a cipher session establishing section configured to establish the cipher session use connection with each of a plurality of client terminals, and to acquire header information to be contained in a cipher session header from each of the plurality of client terminals; and a message transfer section configured to transmit/receive a data communication message to/from each of the plurality of client terminals by using the cipher session use connection. The data communication message includes a cipher data field which includes a client cipher data enciphered by using a client shared key shared by the plurality of client terminals, and a non-cipher data field which includes a cipher session header which contains the header information. The message transfer section converts the cipher session header contained in the non-cipher data field of the data communication message transmitted from any of the plurality of client terminals into a cipher session header corresponding to one of the plurality of client terminals as a transmission destination of the data communication message and transmits the data communication message which has the converted cipher session header, to the client terminal as the transmission destination.

In another exemplary aspect of the present invention, a communication method in which communication of a data between a plurality of client terminals connected with different private networks is performed via a relay server connected with a global network, includes: holding client shared key common to a plurality of client terminals; establishing a cipher session use connection between the relay servers and each of the plurality of client terminals; notifying header information to be contained in a cipher session header from the client terminal to the relay server; generating a client cipher data by enciphering a transmission data by using the client shared key in the client terminal; producing a data communication message comprising a cipher data field which includes the client cipher data and a non-cipher data field which includes a cipher session header having the header information by the client terminal; transmitting the data communication message from the client terminal to the relay server; changing the cipher session header based on the header information corresponding to a client terminal as a destination of the data communication message by the relay server; and transmitting the data communication message in which the header information has been changed, from the relay server to the destination client terminal by using a cipher session use connection which has been established between the relay server and the destination client terminal.

BRIEF DESCRIPTION OFF DRAWINGS

The above and other objects, advantages and features of the present invention will be more apparent from the following description of certain exemplary embodiments taken in conjunction with the accompanying drawings, in which.

Figure 12:
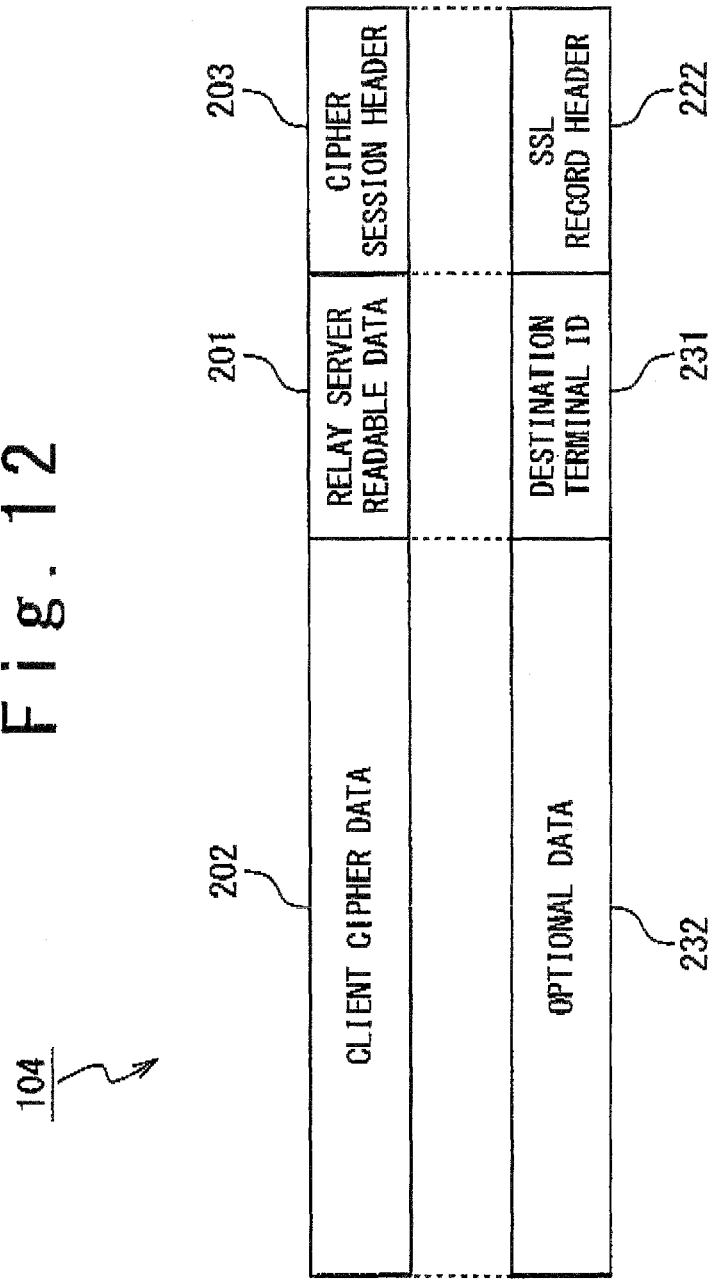
Figure 13:
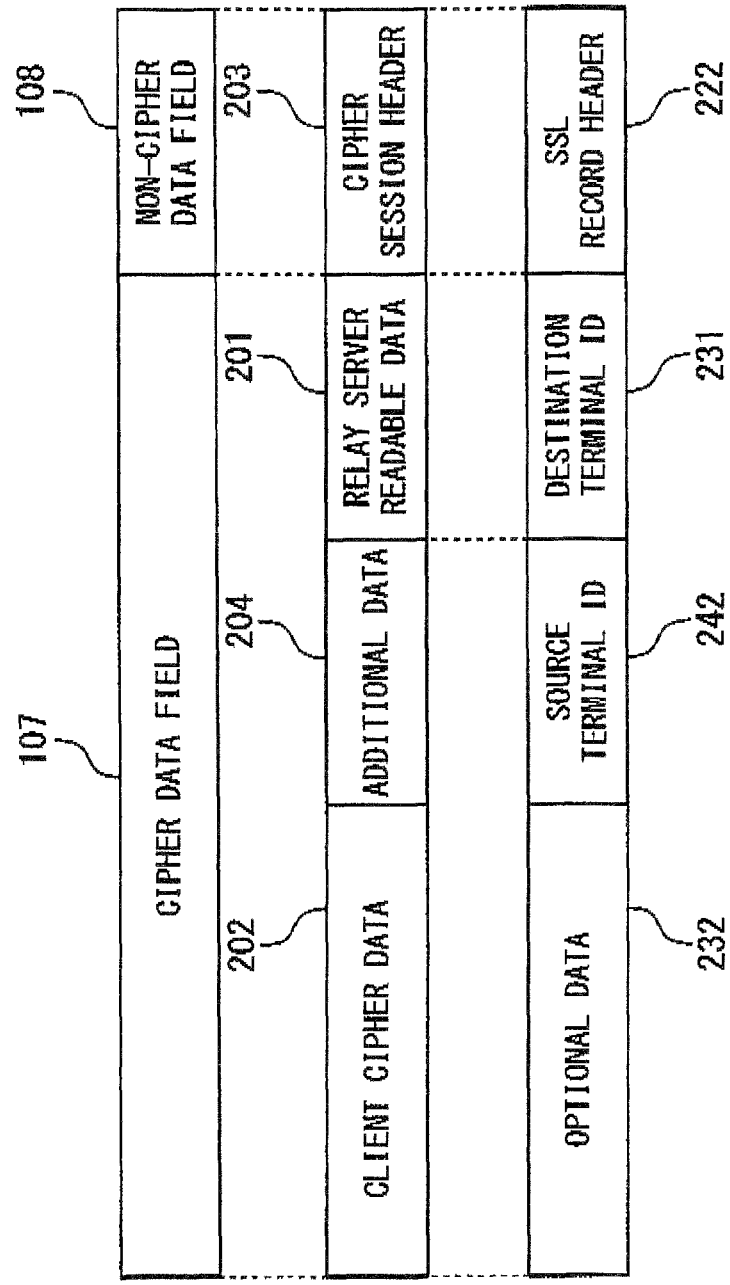

FIG. 12 is a block diagram showing an example of the data communication message transmitted from a client terminal to a relay server in the third exemplary embodiment of the present invention; and FIG. 13 is a diagram showing a cipher data field including an arbitrary additional data inserted in addition to a relay server readable data and a client cipher data in the communication system according to the third exemplary embodiment of the present invention.

EXEMPLARY EMBODIMENTS

Hereinafter, a communication system according to exemplary embodiments of the present invention will be described with reference to the attached drawings. Same, similar or equivalent reference numerals or symbols denote same, similar or equivalent components in the drawings. An example of a communication system will be described in which the communication among client terminals connected to different private networks is relayed by a relay server in a global network.

First Exemplary Embodiment

A communication system 1 according to a first exemplary embodiment of the present invention will be described with reference to Drawings.

Figure 1:
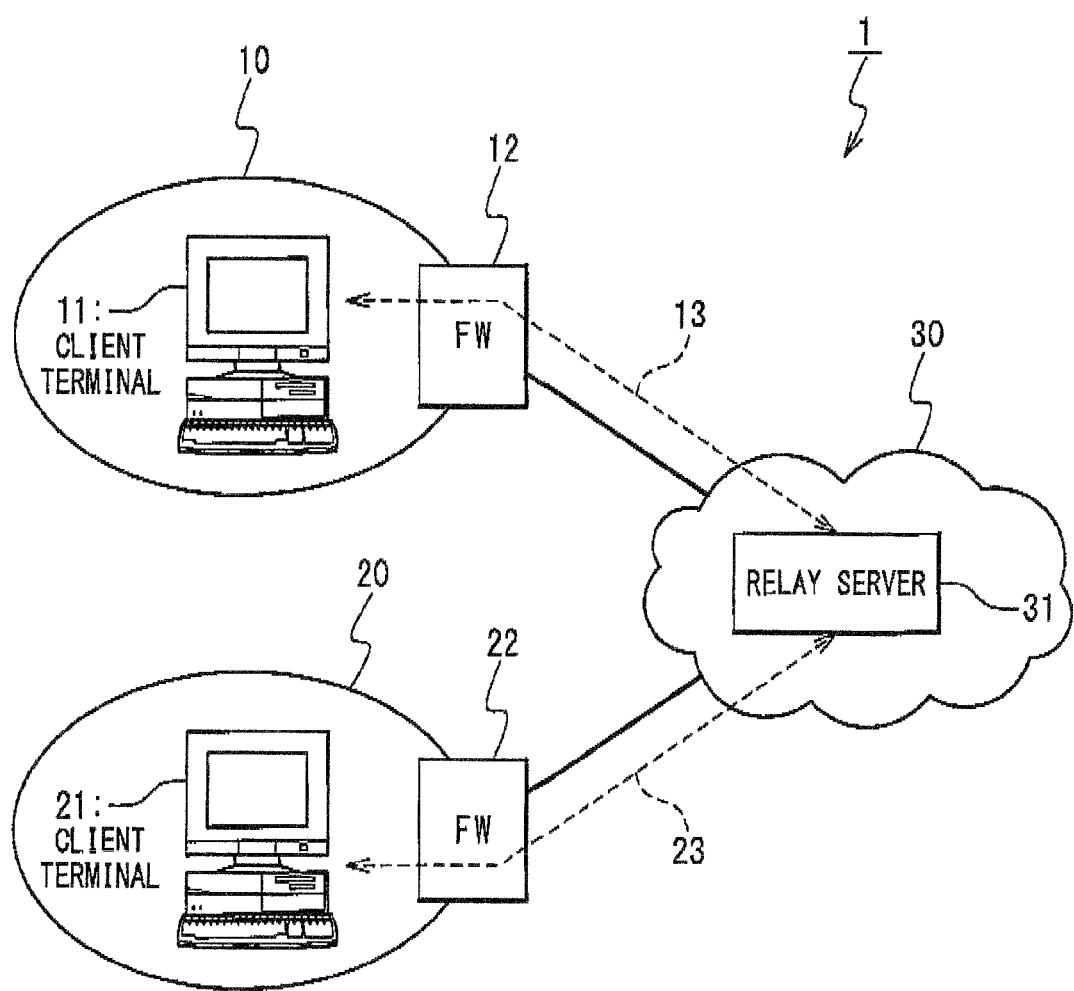
FIG. 1 is a diagram showing a configuration of a communication system according to a first exemplary embodiment of the present invention.

FIG. 1 is a diagram showing a configuration of the communication system 1 according to the first exemplary embodiment. Referring to FIG. 1, the communication system 1 includes client terminals 11 and 21 connected to private networks 10 and 20 in which firewalls 12 and 22 are provided, and a relay server 31 connected to a global network 30.

The client terminals 11 and 21 are communication terminals (e.g., computers) to be connected to the private networks 10 and 20 that are different from each other, and transmit/receive data via the relay server 31. The client terminals 11 and 21 establish cipher sessions with the relay server 31, and transmit/receive a data communication message 104 to be described below by use of a connection based on the cipher sessions. The relay server 31 performs a relaying process of the data communication message 104 transmitted from the client terminals 11 and 21. Each of the firewalls 12 and 22 is set to allow two-directional communication which uses the cipher session whose establishment is requested from the private networks 10 and 20 to the global network 30. A shared key which is common to the client terminals 11 and 21 (to be referred to as a client shared key 101 hereinafter) is exchanged between them before transmitting/receiving the data communication message 104. The client terminals 11 and 21 transmit/receive the data communication message 104 including data which has been enciphered by use of the client shared key 101.

The cipher sessions indicates a virtual communication path where security is ensured. Terminals to establish an cipher session, e.g., the client terminal 11 and the relay server 31 transmit/receive a message to establish the cipher session (to be referred to as an cipher session establishment message 100 hereinafter). The transmission/reception of the cipher session establishment message 100 allows information included in a cipher session header 203 (to be referred to as cipher session header data 102) to be exchanged between the terminals, and a connection is established between the terminals.

The cipher session header 203 includes, as the cipher session header data 102, information such as protocol version, protocols used for cipher and calculation of a MAC (message Authentication Code) (to be referred to as MAC calculation, hereinafter), and a message type (i.e., whether a message is a cipher session establishment message 100 or a data communication message 104). It should be noted that what cipher session header data 102 is included in the cipher session header 203 depends on technique to provide the cipher session.

The connection indicates a communication path between two terminals. More specifically, the connection is identified by information such as an IP address of each of terminals (client terminals 11 and 21, and relay server 31), a protocol number, a transport protocol type such as TCP and UDP (User Datagram Protocol), and a port number used in a transport protocol. The connection established by transmitting/receiving the cipher session establishment message 100 is particularly called a cipher session use connection. In the first exemplary embodiment, it is assumed that a cipher session use connection 13 is established between the client terminal 11 and the relay server 31, and a cipher session use connection 23 is established between the client terminal 21 and the relay server 31. Whether the cipher session use connection 13 or 23 can be identified depends on techniques by which the cipher sessions are provided. Moreover, a connection used for transmitting/receiving the cipher session establishment message 100 and the cipher session use connections are same, but they may be different.

SSL and IPSec are known as techniques to provide ciphers sessions. In specific application level protocols such as HTTP and SIP (Session Initiation Protocol), HTTPS and SIPS using SSL are also known as the techniques to provide cipher sessions.

In case of SSL, an SSL Record Header is used as the cipher session header 203. The SSL Record Header includes a content type field, a length field, and an SSL version field, and a message type is specified in the content type field. For example, a handshake, change cipher spec and so on are specified in the content type field of the cipher session establishment message 100. Moreover, application data is specified in the content type field of the data communication message 104. In the case of SSL, a cipher data field 107 of the data communication message 104 is an inside portion from the SSL record header. A TCP connection is also used as the connection in the case of SSL. In this case, the cipher session use connection 13 or 23 can be identified based on the IP addresses and the TCP port numbers of terminals, between which the connection is established (client terminal 11 or 21, and relay server 31 in this example).

Also, in case of IPSec (IP security protocol), various kinds of headers are used as the cipher session header 203, such as an ISAKMP (Internet Security Association & Key management Protocol) header, an AH (Authentication Header) header, and an ESP (Encapsulating Security Protocol) header. An assigned type of the cipher session header 203 is different, unlike SSL. Moreover, in case of IPSec, the cipher data field 107 of the data communication message 104 is a portion put between a sequence number field (IV (Initial Vector) field if it is used) and an ICV (Integrity Check Value) field. Furthermore, in case of IPSec, each of the cipher session use connections 13 and 23 can be identified based on protocol numbers and the IP addresses of terminals where these connections are established (i.e., the client terminals 11 and 21, and relay server 31 here).

When the exchange the cipher session header data 102 and the establishment of the cipher session use connections 11 and 12 are ended, a client terminal (e.g., client terminal 11) produces a message (i.e., data communication message 104) for transmitting data which is desired to send to a client terminal of a communication counter end (e.g., client terminal 21). The data communication message 104 is divided into a field to enter enciphered data (to be referred to as the cipher data field 107 hereinafter), and a field to enter data which is not enciphered (to be referred to as a non-cipher data field 108 hereinafter). In the data communication message 104, a portion belonging to the cipher data field 107 and a portion belonging to the non-cipher data field 108 are defined by techniques to provide cipher sessions. Data which is desired to send to a communication counter end terminal is subjected to processes of the encipherment and the MAC calculation by using the shared key 101 in the client terminals 11 and 12, and the above processed data is inserted into the cipher data field 107 as the client cipher data 202 and the cipher session header 203 is inserted into the non-cipher data field 108 in order to produce the data communication message 104. There is a case that the cipher session header 203 is partially enciphered and included in the cipher data field 107.

The client terminals 11 and 21 perform a deciphering process or/and a MAC calculation process on the client cipher data 202 included in the cipher data field 107 of the received data communication message 104 by using the client shared key 104 in order to obtain original data.

Each of the firewalls 12 and 22 monitors the cipher session establishment message 100 which is transmitted/received between each of the client terminals 11 and 21 and the relay server 31. When a completion of transmitting/receiving the cipher session establishment message 100 is confirmed, it is confirmed by the firewalls 12 and 22 whether the data communication message 104 is transmitted/received between the terminals on the cipher session use connections 13 and 23, and whether the non-cipher data field 107 follows a defined format. The data communication message 104 confirmed to be an error is blocked off by the firewalls 12 and 22. Moreover, transmission/reception of the cipher session establishment message 100 is authorized only when it is started from the private networks 10 and 20 to the global network 30, and is blocked off by the firewalls 12 and 22 otherwise.

(Configuration of Client Terminal)

Figure 2:
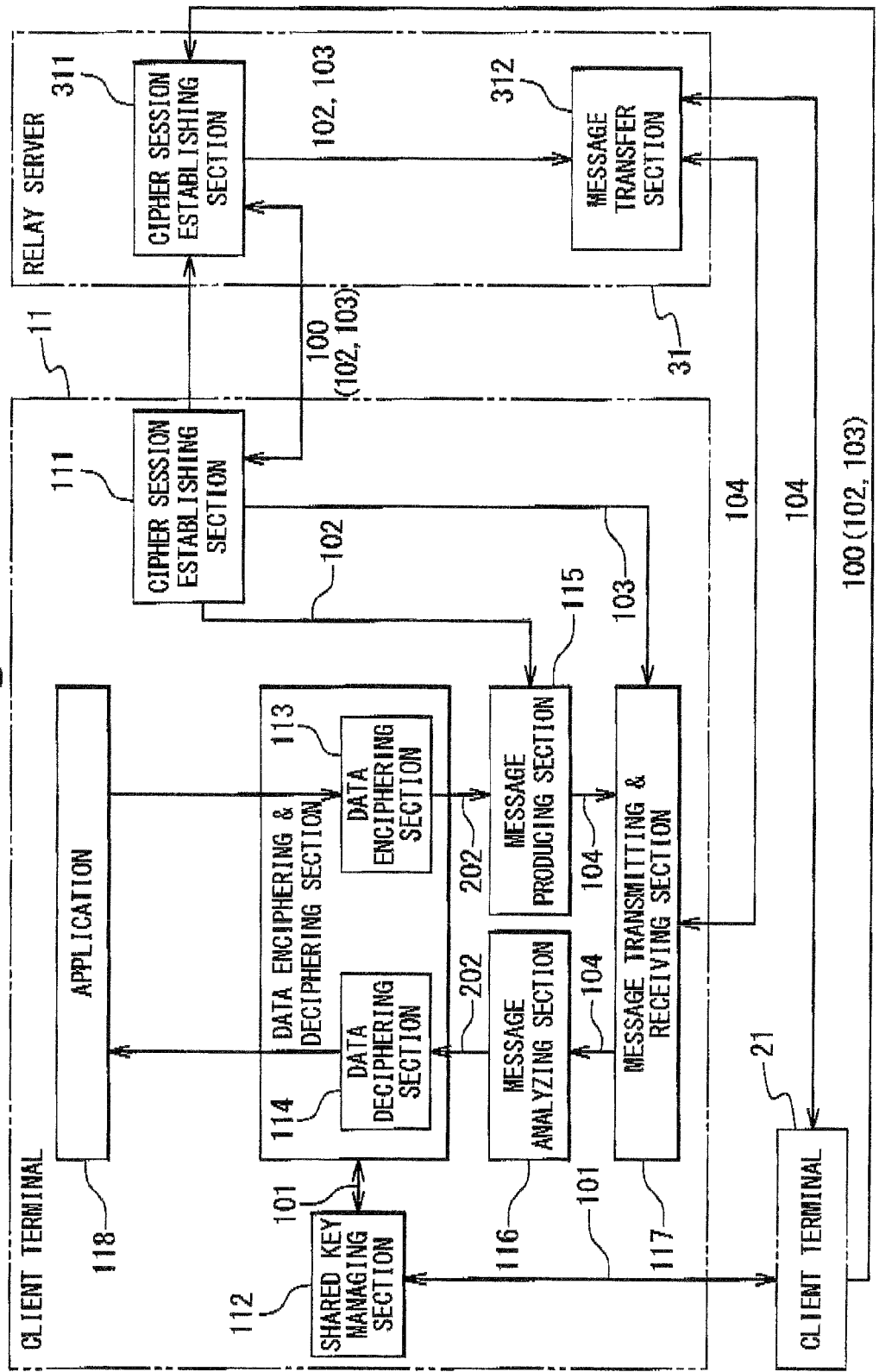
FIG. 2 is a block diagram showing a configuration of client terminals and a relay server in the communication system according to the first exemplary embodiment of the present invention.

Configuration of the client terminal 11 according to the present invention will be described below with reference to FIG. 2. Since the client terminals 11 and 12 are the same configuration, the configuration of the client terminal 11 will be described below.

The client terminal 11 includes a ciphers session establishing section 111, a shared key managing section 112, a data enciphering section 113, a data deciphering section 114, a message producing section 115, a message analyzing section 116, a message transmitting & receiving section 117, and an application 118.

Figure 4:
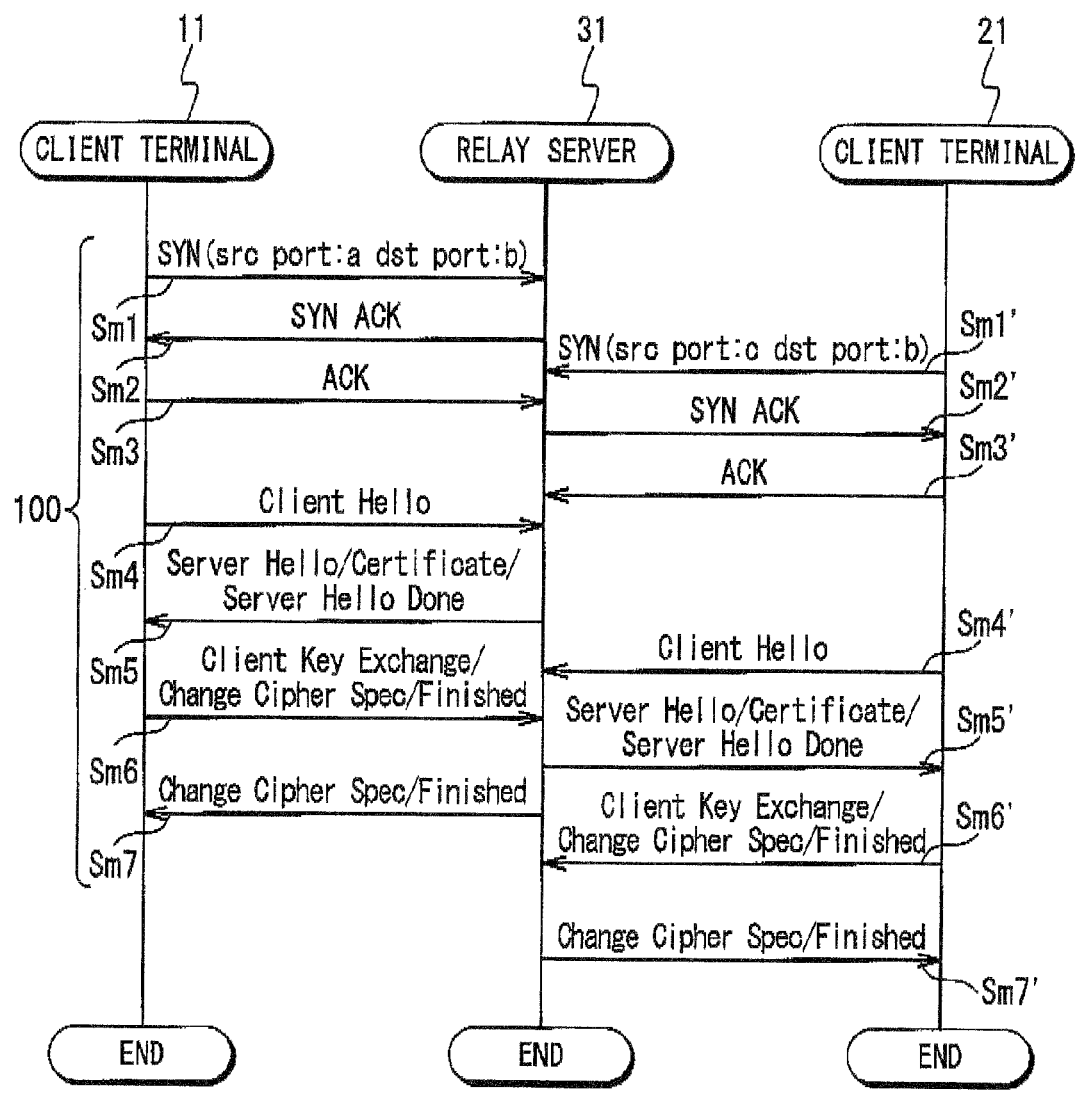
FIG. 4 is a sequence diagram showing an operation of establishing cipher session use connections in the communication system according to the first exemplary embodiment of the present invention in detail.

The cipher session establishing section 111 requests the relay server 31 to establish an cipher session, and transmits/receives the cipher session establishment message 100 to/from the relay server 31. The cipher session establishment message 100 is transmitted/received before starting a communication between the client terminals via the relay server 31. Moreover, the transmission/reception of the cipher session establishment message 100 is always started from the cipher session establishing section 111 of the client terminal in order to prevent the cipher session establishment message 100 from being blocking off by the firewall. That is, cipher session messages sm1 (or sm1') and sm4 (or sm4') are always transmitted from the client terminal 11 or 21 to the relay server 31 as shown in FIG. 4.

The cipher session establishing section 111 transmits/receives the cipher establishing message 100 as defined in a cipher session establishment procedure. This allows exchange of the cipher session header data 102 and establishment of the cipher session use connection 13 between the relay server 31 and the client terminal 11. In a usual cipher session establishment procedure, when a cipher session establishing message is transmitted/received, a common shared key (or a session key) is exchanged between terminals which establish the cipher sessions. However, the exchange of the common shard key is not necessary in the present invention. That is, when the cipher session establishment message 100 is transmitted/received between the client terminal 11 and the relay server 31, a session key common to the client terminal 11 and the relay server 31 may not be calculated. This is because the cipher session establishment message 100 transmitted/received between the client terminal 11 and the relay server 31 is shown to the firewall 12 in the middle of a path for the purpose of preventing a two-way communication using the cipher session use connection 13 from being blocked off. However, a common session key may be exchanged between the client terminal 11 and the relay server 31 in transmitting/receiving the cipher session establishment message 100 from a reason to be described below.

The cipher session establishing section 111 notifies to the message producing section 115, the cipher session header data 102 to be included in the cipher session header exchanged with the relay server 31 by transmitting/receiving the cipher session establishment message 100, and notifies information related to the cipher session use connection 13 established with the relay server 31 (to be referred to as connection data 103 hereinafter) to the message transmitting & receiving section 117.

The shared key managing section 112 manages a shared key (to be referred to as a client shared key 101 hereinafter) exchanged between its own terminal and the client terminal 21 to be communicated via the relay server 31 by any scheme. The shared key is used to encipher communication contents of a message transmitted by using cipher sessions and perform MAC calculation, so that eavesdropping, spoofing, and alteration of communication contents or the like are prevented to ensure a communication security. A different shared key may be used for encipherment and MAC calculation.

The data enciphering section 113 enciphers data transferred from the application 118 by using the client shared key 101 managed by the shared key managing section 112, and performs MAC calculation for the transferred data. Either encipherment or MAC calculation may be exclusively performed Encipherment may also be performed partially or entirely for data transferred from the application 118. After performing encipherment and MAC calculation, enciphered data and MAC are transferred to the message producing section 115 as the client cipher data 202.

The message producing section 115 generates the data communication message 104 by using the client cipher data 202 transferred from the data enciphering section 113 and the cipher session header data 102 notified by the cipher session establishing section 111. More specifically, the message producing section 115 inserts the client cipher data 202 into the cipher data field 107 of the data communication message 104. The cipher session header 203 is also produced on the basis of the cipher session header data 102 to indicate that a message type is the data communication message 104 and is inserted into the non-cipher data field 108. If the cipher session establishing section 111 transmits/receives the cipher session establishment message 100 by using SSL, an SSL record header 222 is added into the non-cipher data field 108 as the cipher session header 203, specifying application data in a content type field. The data communication message 104 thus produced is transferred to the message transmitting & receiving section 117.

The data which has been inserted into the cipher data field 107 is not checked by the firewall 12. Therefore, the message producing section 115 may add arbitrary data to the cipher data field 107 in addition to the client cipher data 202. For example, a data including a data size value 211 of the client cipher data 202 may be inserted into the cipher data field 107 as additional data, as will be described below. When the additional data is inserted into the cipher data field 107, it is necessary that a terminal which has received the data communication message 104 can detect a portion of the client cipher data 202 and a portion of the data added by the message producing section 115 in the cipher data field 107. The above operation is realized by methods of adding flag fields indicating locations of the client cipher data 202 and the additional data to the cipher data field 107, and adding the data size value 211 of the client cipher data 202 and the additional data to the cipher data field 107.

The message transmitting & receiving section 117 transmits to the relay server 31, the data communication message 104 transferred from the message producing section 115. At this time, the message transmitting & receiving section 117 specifies the cipher session use connection 13 on the basis of the connection data 103 notified by the cipher session establishing section 111, and uses this connection to transmit the data communication message 104 to the relay server 31. If SSL is used for transmitting/receiving the cipher session establishment message 100, a TCP connection notified by the cipher session establishing section 111 is used to transmit the data communication message 104 to the relay server 31.

The message transmitting & receiving section 117 also receives the data communication message 104 transmitted from the relay server 31 by using the cipher session use connection 13. The message transmitting & receiving section 117 transfers the received data communication message 104 to the message analyzing section 116.

The message analyzing section 116 extracts the client cipher data 202 from the cipher data field 107 of the data communication message 104 transferred from the message transmitting & receiving section 117. The client cipher data 202 extracted here is a data which can be subjected to either decipherment or MAC calculation or both of them by using the client shared key 101 held by the shared key managing section 112. That is, it is the client cipher data 202 inserted into the cipher data field by the client terminal 21 of the communication counter end. The message analyzing section 116 transfers the extracted client cipher data 202 to the data deciphering section 114. If only the client cipher data 202 is inserted into the cipher data field 107 of the received data communication message 104, the entire cipher data field 107 is transferred to the data deciphering section 114.

The data deciphering section 114 performs decipherment and MAC calculation of the data transferred from the message analyzing section 116 by using the client shared key 101 managed by the shared key managing section 112, and transfers the data to the application 118.

The application 118 is a program running on its own terminal, representing all the programs which perform communication with terminals other than its own terminal via networks. For example, programs running on OS (Operation System) kernels are also included in the application 118.

In a related technique, when a usual cipher session is used between the client terminal and the relay server, only the data which has been subjected to encipherment and MAC calculation by using a session key exchanged between the client terminal and the relay server, is inserted into the cipher data field of data communication message. However, in the client terminal 11 according to the present invention, the client cipher data 202 which was subjected to the encipherment and MAC calculation by using the client shared key 101 exchanged with the client terminal 21 of the communication counter end instead of the relay server 31 is inserted into the cipher data field 107. Therefore, the data communication message 104 in the present invention is not consistent with a format of the data communication message 104 which are originally defined by various kinds of techniques such as SSL and IPSec to provide a cipher session. However, what is checked by the firewall 12 in the data communication message 104 is only whether it is transmitted/received on the cipher session use connection 13 and whether the non-cipher data field 108 follows an originally defined format. The data communication message 104 is transmitted/received by the message transmitting & receiving section 117 by using the cipher session use connection 13, and the cipher session header 203 is inserted into the non-cipher data field 108 by the message producing section 115. Therefore, the data communication message 104 transmitted by the client terminal 11 reaches the relay server 31 without being blocked off by the firewall 12.

(Configuration of Relay Server 31)

Next, the configuration of the relay server 31 will be described with reference to FIG. 2. The relay sever 31 is provided with a cipher session establishing section 311 and a message transfer section 312.

The cipher session establishing section 311 transmits/receives the cipher session establishment message 100 to/from the client terminals 11 and 12 in response to cipher sessions establishment requests from the client terminals 11 and 12. The cipher session establishing section 311 transmits/receives the cipher session establishment message 100 to/from at least two client terminals. Through transmission/reception of the cipher session establishment message 100, the cipher session establishing section 311 exchanges the cipher session header data 102 with each of the client terminals 11 and 12. The cipher session establishing section 311 notifies the message transfer section 312 of the cipher session header data 102 exchanged with each of the client terminals 11 and 12, and the connection data 103 related to the cipher session use connections 13 and 23 established with each of the client terminals.

The message transfer section 312 specifies a cipher session use connection established for each of the client terminals on the basis of the connection data 103 notified from the cipher session establishing section 311. The message transfer section 312 also transfers the received data communication message 104 to the destination client terminals. For example, the message transfer section 312 transfers the data communication message 104 on the basis of the notified connection data 103 to an cipher session use connection which differs from the cipher session use connection used for receiving the data communication message 104.

The message transfer section 312 does not perform decipherment and MAC calculation for the client cipher data 202 which has been subjected to encipherment and MAC calculation by using the client shared key 101 at least, in the cipher data field 107 of the transferred data communication message 104. The message transfer section 312 also changes contents of the cipher session header 203 included in the non-cipher data field 108 of the data communication message 104 on the basis of the cipher session header data 102 corresponding to the client terminals 11 and 12 as transfer destinations. However, if the contents of the cipher session header 203 added to the received data communication message 104 are the same as the cipher session header data 102 corresponding to the client terminals as the transfer destinations, the cipher session header 203 may not be replaced.

In the related techniques, when the terminals such as the client terminal and the relay server communicate with each other by using cipher sessions, one of the terminals performs decipherment and MAC calculation to the cipher data field 107 of data communication messages received from the other terminal by using a session key exchanged at the time of establishing the cipher sessions.

On the contrary, in the present invention, the relay server 31 does not perform decipherment and MAC calculation to the client cipher data 202 at least in the cipher data field 107 of the data communication message 104 received from the client terminals 11 and 21. Also, in the present invention, the client cipher data 202 which was subjected to encipherment and MAC calculation by using the client shared key 101 exchanged between the client terminal as a transmission source and the client terminal as a transfer destination is inserted into the cipher data field 107. Therefore, the data communication message 104 in the present invention is not consistent with a format of the data communication message 104 which is originally defined by various kinds of techniques such as SSL and IPSec by which cipher sessions are provided. However, what is checked by the firewalls 12 and 22 in the data communication message 104 is only whether it is transmitted/received on the cipher session use connections 12 and 22 established between the terminals in advance, and whether the non-cipher data field 108 follows an originally defined format, as described above. The data communication message 104 is transmitted by the message transfer section 312 on the cipher session use connections established with the client terminal as the transfer destination. Also, a cipher session header based on the cipher session header data 102 exchanged with the client terminal as the transfer destination is inserted into the non-cipher data field 108. Therefore, the non-cipher data field 108 is consistent with an originally defined definition of the data communication message 104. Accordingly, the data communication message 104 reaches from the relay server 31 to the client terminal as the transfer destination without being blocked off by the firewalls 12 and 22.

(Operation of Communication System 1)

A data transfer operation of the communication system 1 according to the present invention will be described with reference to FIG. 3. The operation of the communication system 1 will be described below by using an example of transmitting the data communication message 104 from the client terminal 11 to the client terminal 21.

Figure 3:
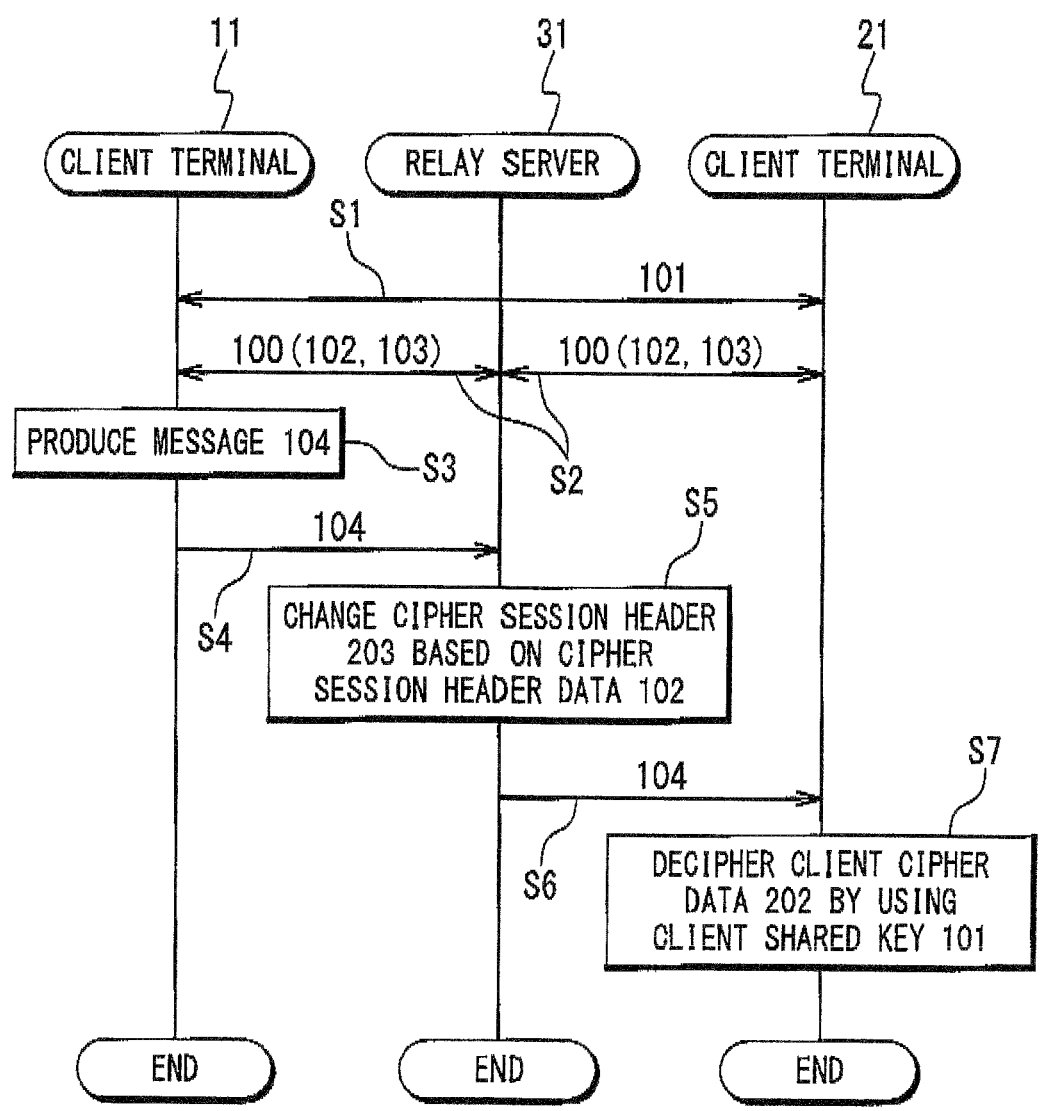
FIG. 3 is a sequence diagram showing a data transfer operation of the communication system according to the first exemplary embodiment of the present invention.

FIG. 3 is a sequence diagram showing a data transfer operation between the client terminals in the communication system 1. Referring to FIG. 3, the client terminal 11 exchanges the client shared key 101 with the client terminal 21 in advance by any method (step S1). Methods of exchanging the client shared key 101 may be realized by exchanging the client shared key 101 recorded in media such as a floppy (registered trademark) disk and a USB memory by using physical transfer such as direct delivery and mailing, and may be realized by exchanging electronic mails in which the client shared key 101 is attached. Furthermore, a method may be employed in which a shared key storage server (not shown) is separately provided to store the client shared key 101 and is accessed to obtain the client shared key 101. However, in this case, it is necessary to prevent distribution of the client shared key 101 to unauthenticated users by restricting access to the shared key storage server by using passwords or the like.

Next, each of the client terminals 11 and 21 transmits/receives the cipher session establishment message 100 to/from the relay server 31 in order to establish the cipher session use connections 13 and 23 (step S2). The transmission/reception of the cipher session establishment message 100 is always started from the cipher session establishing section 111 of the client terminal. That is, cipher session messages sm1 (or sm1') and sm4 (or sm4') are always transmitted from the client terminals 11 and 21 to the relay server 31 as shown in FIG. 4. Through the transmission/reception of the cipher session establishment message 100, the client terminals 11 and 21 exchange the individual cipher session header data 102 with the relay server 31. The client terminal 11 and the relay server 31 also obtain the connection data 103 related to the established cipher session use connection 13. Similarly, the client terminal 21 and the relay server 31 obtain the connection data 103 related to the established cipher session use connection 23.

When the transmission/reception of the cipher session establishment message 100 is completed between the client terminals 11 and 21 and the relay server 31 at step S2, the firewalls 12 and 22 regard as completion of establishment of the cipher sessions between the client terminals 11 and 21 and the relay server 31. Thereafter, the firewalls 12 and 22 permit two-way communication of the data communication messages 104 by using the cipher session use connections 13 and 23.

The client terminal 11 which transmits a data transferred from the application 118 to the client terminal 21 enciphers this data to produce the data communication message 104 (step S3). Here, the client terminal 11 enciphers the data to be transmitted, by using the client shared key 101, and inserts the enciphered data into the cipher data field 107, and inserts the cipher session header 203 based on the cipher session header data 102 exchanged in step S2 into the non-cipher data field 108. Thus, the client terminal 11 produces the data communication message 104.

The client terminal 11 transmits the produced data communication message 104 to the relay server 31 via the cipher session use connection 13 (step S4).

The relay server 31 replaces the cipher session header 203 of the data communication message 104 received from the client terminal 11 on the basis of the cipher session header data 102 notified by the client terminal 21 as the transfer destination (step S5). Here, the cipher session header 203 inserted into the non-cipher data field 108 of the data communication message 104 is rewritten into contents of the cipher the session header data 102 indicative of the transfer destination. However, replacement may not be required if the cipher session header 203 added to the received data communication message 104 has the same contents as the cipher session header 203 including the cipher session header data 102 obtained from the client terminal 21 as the transfer destination. Moreover, the data relay server 31 does not perform decipherment and MAC calculation on the client cipher data 202 which was subjected to decipherment and MAC calculation at least by using the client shared key 101 in the cipher data filed 107 of the received data communication message 104.

The relay server 31 transmits the data communication message 104 with the replaced cipher session header 203 to the client terminal 21 (step S6). At this time, the relay server 31 specifies the cipher session use connection 21 on the basis of the connection data 103 corresponding to the client terminal 21 as the transfer destination, and uses this connection to transmit the data communication message 104 to the client terminal 21.

The client terminal 21 receives the data communication message from the relay server 31 via the cipher session use connection 23. The client terminal 21 extracts the client cipher data 202 from the cipher data field 107 of the received data communication message 104, and performs either decipherment or MAC calculation or both of them by using the client shared key 101 exchanged with the client terminal 11 at a step S1 (step S7). The deciphered data and calculated MAC here are transferred to the application 118 of the client terminal 21.

The above operation allows two-way communication via the relay server between the two client terminals 11 and 21 connected to the different private networks where the firewalls 12 and 22 are provided.

Next, an operation example of establishing the cipher session use connections 13 and 23 at the step 2 will be described with reference to FIG. 4. FIG. 4 is a message sequence when the cipher session establishing section 111 of the client terminals 11 and 21 transmits/receives the cipher session establishment message 100 by SSL.

A TCP connection is used in SSL for transmitting/receiving the cipher session establishment message. Since the TCP connection requires a connection establishing process, the cipher session establishing section 111 performs a TCP connection establishing process before transmitting a message for requesting cipher session establishment. More specifically, the cipher session establishing section 111 establishes a TCP connection between the client terminal 11 (or 21) and the relay server 31 by the cipher session establishment messages 100 (i.e., sm1 to sm3 or sm1' to sm3') as shown in FIG. 4. That is, the TCP connection is established by: sm1 (or sm1'): connection port notification (SYN) from the client terminal 11 (or 21) to the relay server 31; sm2 (or sm2'); response to the notification (SYN ACT) from the relay server 31 to the client terminal 11 (or 21); and sm3 (or sm3'); response (ACT) from the client terminal 11 (or 21) to the relay server 31.

Next, the client terminal 11 (or 21) uses this TCP connection to transmit/receive the cipher session establishment message 100 (i.e., sm4 to sm7 or sm4' to sm7') to/from the relay server 31 on the basis of a procedure defined by SSL. Whether or not a connection (TCP connection in this example) used for transmitting/receiving the cipher session establishment message 100 is required depends on the type of techniques by which the cipher session establishment message 100 is transmitted/received.

More specifically, the cipher session establishing section 111 of the client terminal 11 (or 12) initially transmits the ciphers session establishment message sm4 for requesting the relay server 31 to establish a cipher session. If SSL is used in the cipher session establishment message, a Client Hello message is applicable to the cipher session establishment message sm4 (or sm4') which requests cipher session establishment. This also allows the relay server 31 to identify the client terminal 11 (or 21) for which a connection should be established.

After the message sm4 (or sm4') for requesting cipher session establishment is transmitted from the client terminal 11 (or 21), the cipher session establishment message 100 (i.e., sm5 to sm7 or sm5' to sm7') is transmitted/received between the relay server 31 and the client terminal 11 (or 21). Performance here includes: sm5 (or sm5'): authentication of the client terminal as connection target (Sever Hello/Certificate/

Server Hello Done); sm6 (or sm6'): session key exchange (Client Key Exchange) between the client terminal 11 (or 21) and the relay server 31; sm6 (or sm6'): setting of the newly established cipher session use connection 13 (or 23) (Change Cipher Spec/Finished); and sm7 (or sm7'): (Change Cipher Spec/Finished). Therefore, the cipher session use connections 13 and 23 are established between the client terminals 11 and 21 and the relay server 31, respectively. The connection data 103 related to the cipher session use connections 13 and 23, and the cipher session header data 102 are also exchanged between each of the client terminals 11 and 21 and the relay server 31. The session key exchange may not be performed between the client terminals 11 and 21 and the relay server 31. However, the aforementioned session key exchange is performed if it is desired to include information readable by only the relay server 31 in the data communication message 104, as will be described below.

Figure 5:
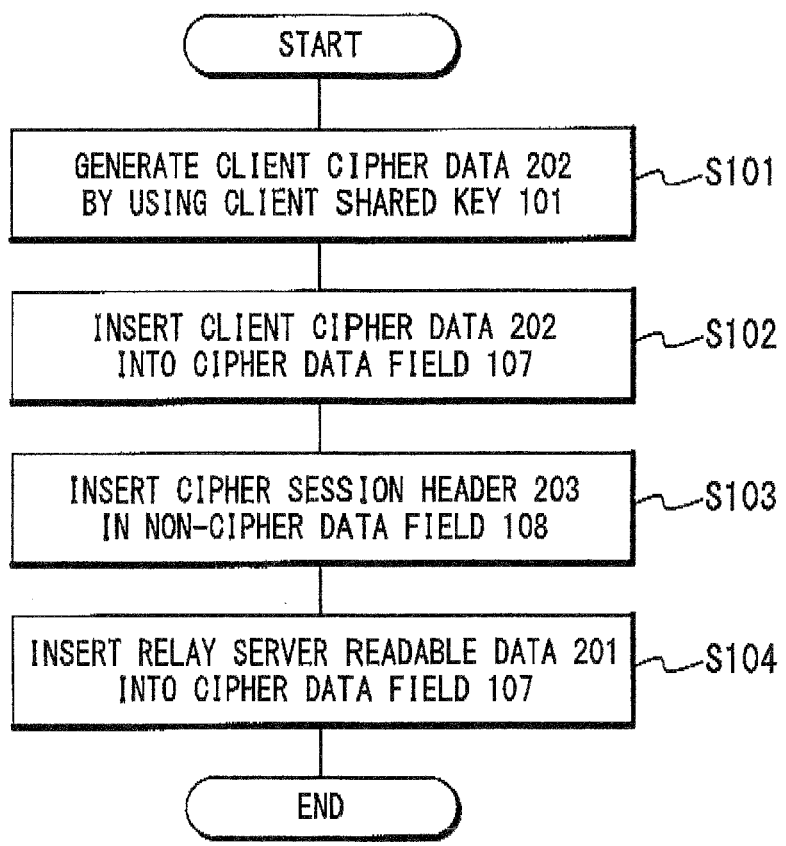
FIG. 5 is a flow diagram showing an operation of producing the data communication message in the communication system according to the first exemplary embodiment of the present invention.

FIG. 5 is a flow diagram showing an operation of producing the data communication message 104 at the step S3. The operation of producing the data communication message 104 will be described with reference to FIG. 5.

When the transmission/reception of the cipher session establishment message 104 is completed, the data enciphering section 113 of the client terminal 11 enciphers a data transferred from the application 118 by using the client shared key 101 managed by the shared key managing section 112, and/or performs MAC calculation for the transferred data in order to produce the client cipher data 202 (step S101).

Figure 6:
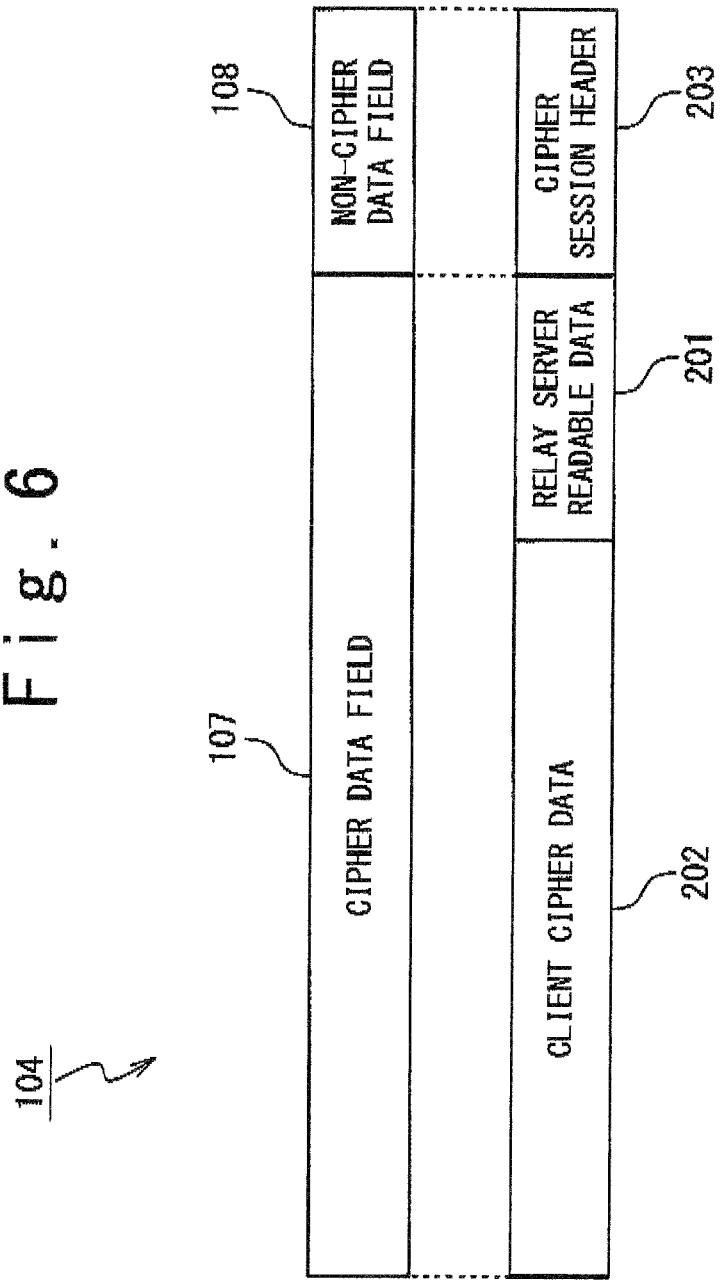
FIG. 6 is a diagram showing the format of a data communication message produced by a message producing section in the communication system according to the first exemplary embodiment of the present invention.

The client enciphering section 113 transfers the produced client cipher data 202 to the message producing section 115. The message producing section 115 produces the data communication message 104 as shown in FIG. 6. Referring to FIG. 6, the data communication message 104 is composed of the cipher data field 107 and the non-cipher data field 108. The message producing section 115 inserts the client cipher data 202 into the cipher data field 107 (step S102). The message producing section 115 also produces the cipher section header 203 on the basis of the cipher section header data 102 notified by the cipher session establishing section 111 in order to indicate that a message type is the data communication message and to insert into the non-cipher data field 108 (step S3).

Here, arbitrary data may be inserted into the cipher data field 107. Therefore, the message producing section 115 inserts a data which is readable by the relay server 31 (to be referred to as relay server readable data 201 hereinafter) into the cipher data field 107 (step S104). The relay server readable data 201 inserted here is any data selected from plaintext data, data enciphered by using the session key exchanged with the relay server 31, and MAC of data, or these combinations.

Thus, the message producing section 115 produces the data communication message 104. The order of steps s102 to S104 is not limited.

As described above, what is checked by the firewalls 12 and 22 in the data communication message 104 is only whether it is transmitted/received on the cipher session use connections 13 and 23, and whether the non-cipher data field 108 follows an originally defined format. Therefore, the arbitrary data can be included in the cipher data field 107.

For example, a data which is transmitted from a client terminal to another client terminal of a communication counter end is dumped within the terminal in a packet form including the layer-2 headers so that its contents can be included in the cipher data field. The terminals transmit/ receive the packet including the layer-2 header from each other, which allows communication as if the client terminals connected to different private networks are connected to the same LAN.

Figure 7:
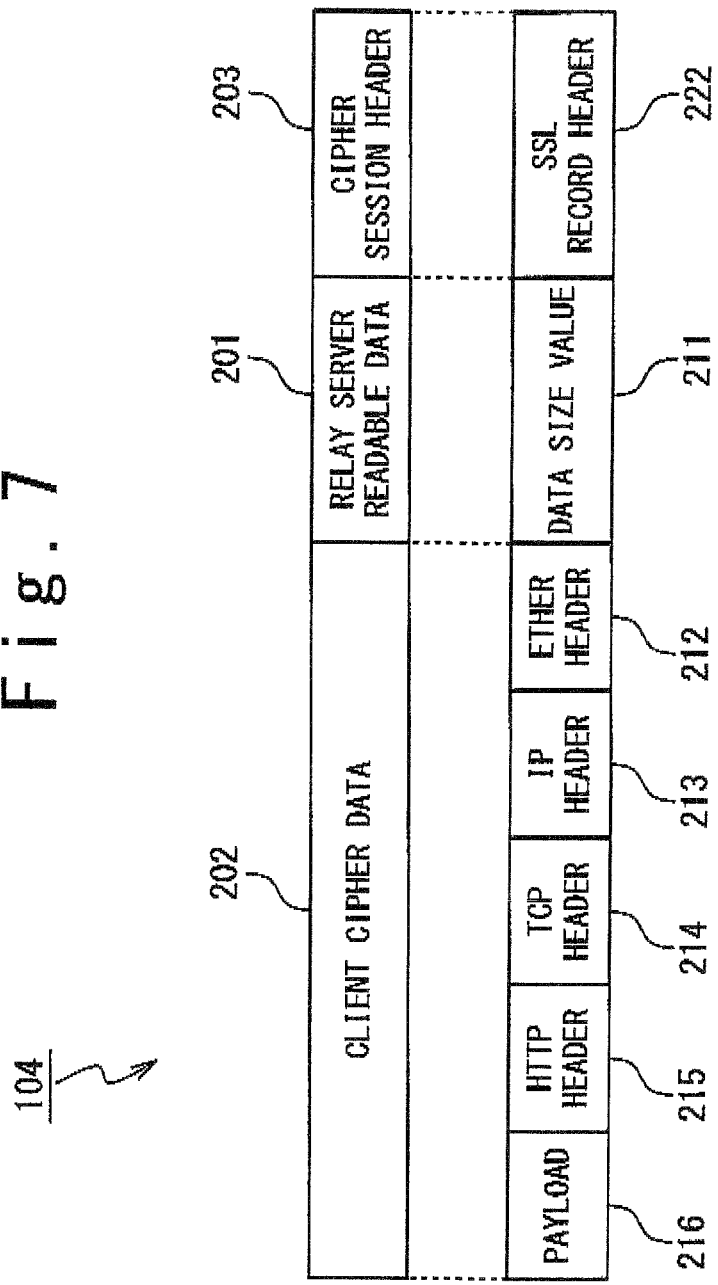
FIG. 7 is a diagram showing the format of a data communication message produced by a message producing section in the communication system according to the first exemplary embodiment of the present invention.

FIG. 7 shows a configuration example of the data communication message 104 in which a packet including the layer-2 headers is included in the cipher data field when the cipher session establishment message is transmitted/received by using SSL. The SSL record header 222 is inserted in the cipher session header 203 when SSL is used.

Referring to FIG. 7, the packet including the layer-2 headers is enciphered by the data enciphering section 113 by using the client shared key 101, and inserted into the cipher data field 107 as the client cipher data 202. A packet enciphered here includes an Ether header 212, an IP header 213, a TCP header 214, an HTTP header 214, and a payload 216. The message producing section 115 also includes a size value of this packet (to be referred to as a data size value 211 hereinafter) in the cipher data field 107 as the relay server readable data 201. Therefore, a transfer process can be performed for every packet on the side of the relay server 31.

The message transfer section 312 of the relay server 31 is capable of determining a range of one packet by analyzing the data size value 211 even if the packet is enciphered. Therefore, the relay server 31 is allowed to transfer data for every packet to the client terminal as the communication counter end. Accordingly, a packet re-establishing process is not required in the client terminal on a reception side.

More specifically, the message transfer section 312 reads the data size value 201 inserted in the cipher data field 104 of the received data communication message 104, and reads data of a length specified by the data size value 201 (i.e., client cipher data 202 in this example) from the cipher data field 107. The read data is entered into the cipher data field 107 of the new data communication message 104 and transferred to the client terminal as the communication counter end.

Figure 8:
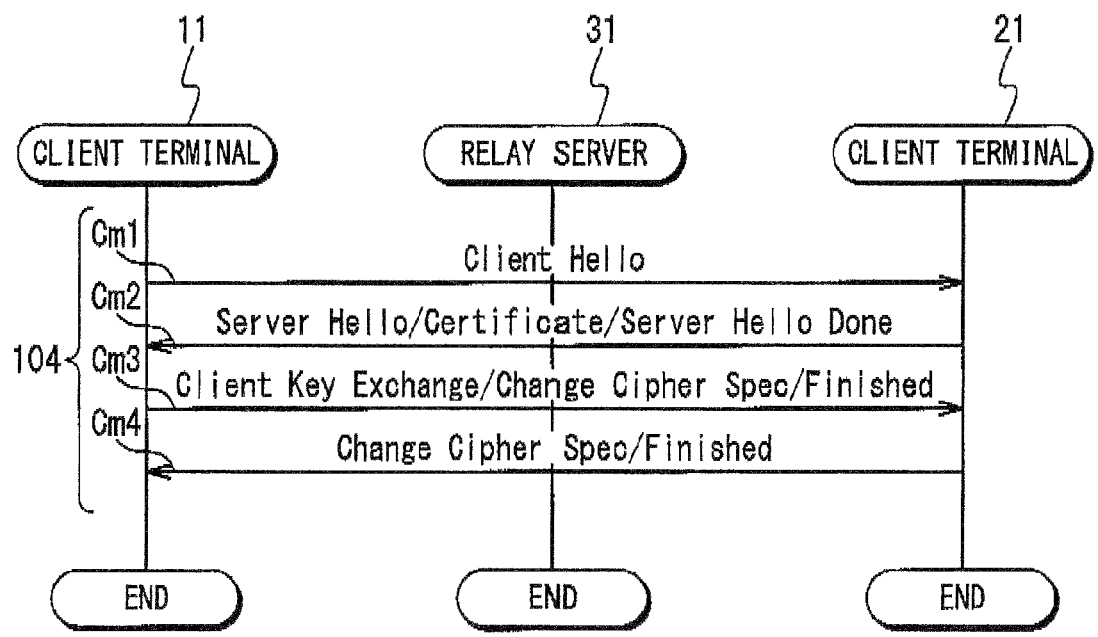
FIG. 8 is a sequence diagram showing an operation of exchanging the client shared key by using SSL in the communication system according to the first exemplary embodiment of the present invention.
Figure 9:
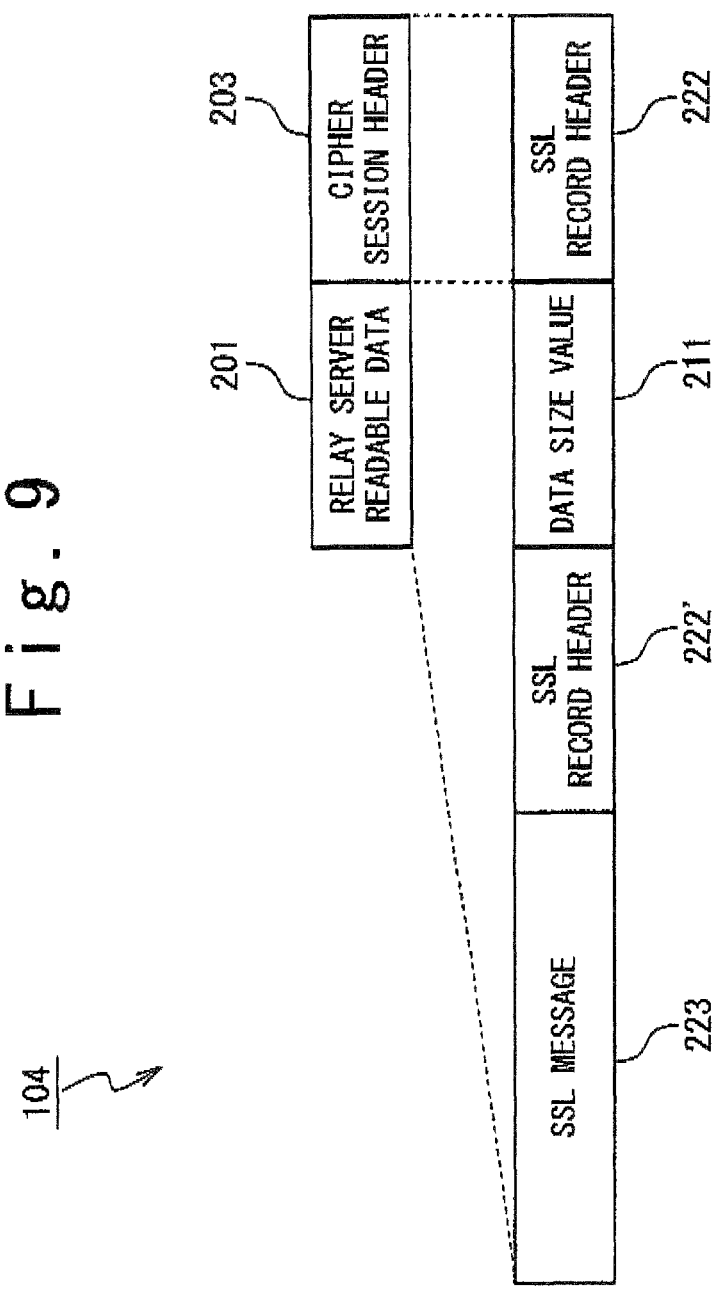
FIG. 9 is a diagram showing the format of a data communication message produced by a message producing section in the communication system according to the first exemplary embodiment of the present invention.

Next, an operation example of exchanging the client shared key 101 will be described with reference to FIGS. 8 and 9. The client shared key 101 is exchanged before establishing the cipher session use connections 13 and 23 in the aforementioned operation of steps S1 through S7. However, in addition to the above case, the client shared key 101 may be exchanged between the client terminals by using the cipher session use connections 13 and 23. At this time, the client terminals may directly exchange the client shared key 101 with each other by using existing standard mechanisms such as SSL and IKE (Internet Key Exchange) of IPSec, for example. FIG. 8 is a message sequence showing an operation of exchanging the client shared key 101 using SSL.

In an example shown in FIG. 8, it is assumed that the client terminals 11 and 21 transmit/receive the cipher session establishment message 100 to/from the relay server 31 by SSL previously in the same manner as the step S2. Here, the client terminals 11 and 21 transmit/receive the data communication message 104 as shown in FIG. 9 via the cipher session use connections 13 and 23 in order to exchange the client shared key 101.

The data communication message 104 transmitted from the client terminal 11 will be described below in details. The shared key managing section 112 of the client terminal 11 initially generates the cipher session establishment message 100 to be sent to the client terminal 21 as the communication counter end, and transfers the message to the message producing section 115. The message producing section 115 inserts the transferred cipher session establishment message 100 into the cipher data field 107 as the relay server readable data 201, and inserts the cipher session header 203 into the non-cipher data field 108 in order to produce the data communication message 104. The cipher session establishment message 100 to be inserted here includes an SSL message 223 and an SSL record header 222' to be readable by the relay server 31. The data communication message 104 thus produced is transmitted to the relay server 31 by the message transmitting & receiving section 117 by using the cipher session use connection. The above operation is applied to the client terminal 21 in the same manner.

In the message producing section 115, the transferred cipher session establishment message 100 may be inserted in a plaintext without making any changes, and may be inserted after performing encipherment and MAC calculation for the cipher session establishment message 100 by using the shared key (e.g., session key) exchanged with the relay server 31 in any method. If the cipher session establishment message 100 which has been subjected to encipherment and/or MAC calculation is inserted, it is preferable that the message producing section 115 also inserts a flag data into the cipher data field 107 of the data communication message 104, to indicate encipherment of the cipher session establishment message 100. Therefore, the relay server 31 is allowed to know the necessity of decipherment when the data communication message 104 is received. It is also preferable that the data size value 211 is inserted in the cipher data field 107 as the relay server readable data 201, so that the relay server 31 is allowed to detect the size of a packet inserted in the cipher data field 107.

The data communication message 104 thus produced is used and transmitted/received between the client terminals 11 and 12 so that the client shared key 101 can be exchanged. Here, the contents included in the SSL message 223 are; cm1 (Client Hello) and cm2; (Server Hello/Certificate/Server Hello Done) for identifying and authorizing the client terminal with which the client shared key 101 is shared; cm3: (Client Key Exchange) for exchanging the client shared key; and cm4: (Change Cipher Spec/Finished) for exchanging information related to the cipher session use connections 13 and 23 to be used.

The message transfer section 312 of the relay server 31 transfers the received data communication message to the remaining client terminal. If the SSL message 223 is subjected to encipherment and MAC calculation in a form decipherable by the relay server 31, the message subjected to decipherment and/or MAC calculation is transferred to the client terminal as the transfer destination in a plaintext or after re-enciphering by using the shared key (ex. session key) which was exchanged with the client terminal as the transfer destination by any method.

In receiving the above-mentioned data communication message 104, the message analyzing section 116 of the client terminals 11 and 21 extracts a cipher session establishment message (i.e., SSL message 223) and transfers it to the shared key managing section 112.

According to the above procedure, the client terminals are allowed to directly exchange the client shared key 101 with each other by using existing standard mechanisms such as SSL and IKE of IPSec for example.

Next, authentication of the relay server 31 and the client terminals 11 and 21 will be described. If spoofing the client terminals 11 and 21 and the relay server 31 or the like is observed, authentication of the client terminals from each other can be realized by encipherment, decipherment and MAC calculation of transmitted/received data by using the client shared key 101. However, in order to ensure more sufficient security, it is necessary to authenticate the relay server 31 from the client terminals 11 and 21, and authenticate the client terminals 11 and 21 from the relay server 31. It is preferable that authentication of the client terminals 11 and 21 by the relay server 31 and authentication of the relay server 31 by the client terminals 11 and 21 are both realized based on MAC of the data communication message 104 calculated by using the shared keys (or session keys) which have been exchanged between each of the client terminals 11 and 21 and the relay server 31. At this time, the session keys need to be exchanged between each of the client terminals 11 and 21 and the relay server 31.

An operation of authenticating the client terminals 11 and 21 and the relay server 31 in the communication system 1 will be described below. It is assumed that the common session keys are exchanged between each of the client terminals 11 and 21 and the relay server 31 prior to the authentication. For example, the session keys are exchanged by transmitting/receiving the cipher session establishment message 100 in the above step S2.

The message producing section 115 of each of the client terminals 11 and 21 uses the session key exchanged with the relay server 31 to perform MAC calculation for the entire data communication message 104 produced at the above step S3 or for a part of the produced data communication message 104 as agreed with the relay server 31 in advance, so that MAC is inserted into the cipher data field 107.

At the above step S5, the message transfer section 312 of the relay server 31 performs MAC calculation for the received data communication message 104 entirely or partially by using the above session keys. The MAC included in the data communication message 104 is also compared with MAC calculated by itself in order to confirm whether or not they are consistent. Therefore, the relay server 31 is allowed to confirm that the received data communication message 104 is a message transmitted from a normal client terminal, so that spoofing the client terminals can be prevented. Spoofing the relay server 31 can also be prevented in authentication of the relay server 31 by the client terminals 11 and 21 because the message analyzing section 116 of the client terminals 11 and 21 confirms MAC calculated by the message transfer section 312 of the relay server 31.

In the present invention, data enciphered by using the client shared key 101 common to the client terminals 11 and 21 (i.e., client cipher data 202) is inserted in the cipher data field 107 of the data communication message 104. Therefore, when the relay server 31 relays the data communication message 104, communication security between the client terminals can be ensured without deciphering and re-ciphering the client cipher data 202 in the cipher data field 107. That is, a process load in the relay server 31 can be reduced while retaining the secrecy of data transmitted/received between the client terminals 11 and 21.

Moreover, the cipher session establishment message 100 is transmitted/received between each of the client terminals 11 and 21 and the relay server 31 in the present invention, and the messages to start cipher session establishment (i.e., sm1 or sm1' and sm4 or sm4') are always transmitted from the client terminals to the relay server. Furthermore, the cipher session header 203 based on the cipher session header data 102 exchanged between each of the client terminals 11 and 21 and the relay server 31 is inserted in the non-cipher data field 108 of the data communication message 104. Therefore, even if the firewalls 12 and 22 filter packet transfer by examining data of upper layers equal to or higher than a layer 5, communication can be made between the client terminals 11 and 21 via the relay server 31. That is, according to the present invention, communication between different private networks provided with highly functional firewalls can be made possible.

Second Exemplary Embodiment

Figure 10:
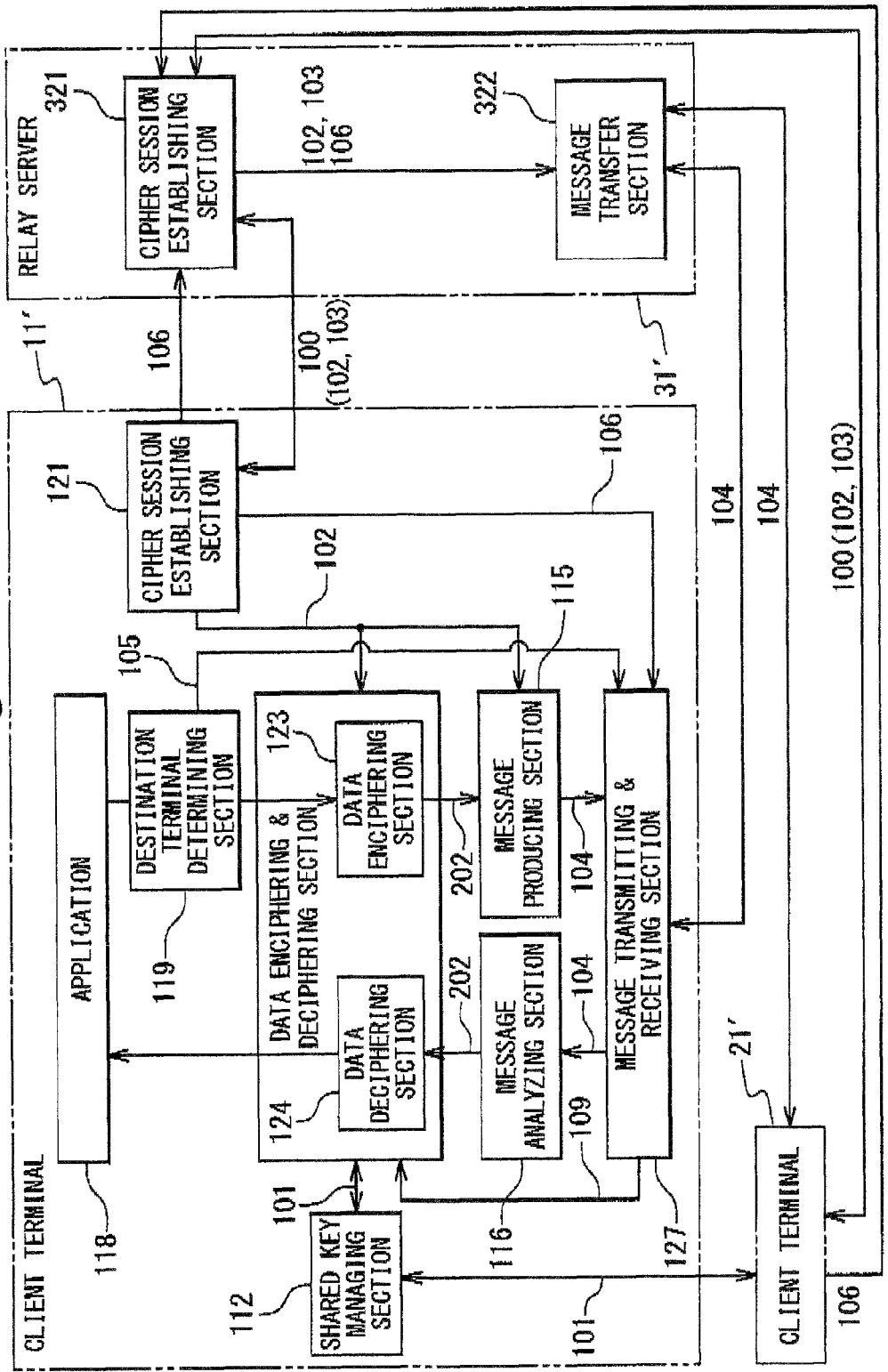
FIG. 10 is a block diagram showing a configuration of the communication system according to a second exemplary embodiment of the present invention.

The communication system 1 according to a second exemplary embodiment of the present invention will be described with reference to FIG. 10. In the second exemplary embodiment, one terminal can communicate with a plurality of terminals via a relay server.

The communication system 1 according to the second exemplary embodiment is provided with client terminals 11' and 21' and a relay server 31' in place of the client terminals 11 and 21 and the relay server 31 in the communication system 1 according to the first exemplary embodiment shown in FIG. 1, and the remaining configuration is the same as that of the first exemplary embodiment. The client terminals 11' and 21' in the second exemplary embodiment communicate with a plurality of client terminals (not shown) such as client terminals connected to other private networks via the relay server 31'. At this time, the client terminals 11' and 21' establish, with the relay server 31', a plurality of cipher session use connections corresponding to a plurality of client terminals as communication destinations in order to realize communication. Here, the client terminals 11' and 21' establish cipher session use connections which differ for every communication counter end with respect to the relay server 31'. The relay server 31' determines cipher session use connections for the transmission destinations on the basis of cipher session use connections used for receiving the data communication message 104 from the client terminals 11' and 21'. Therefore, one client terminal is allowed to communicate with a plurality of terminals via the relay server 31'.

Configuration and operation of the client terminals 11' and 21' according to the second exemplary embodiment will be described with reference to FIG. 10. Since the client terminals 11' and 21' are similarly configured, configuration of the client terminal 11' will be described below.

The client terminal 11' in the second exemplary embodiment is provided with a destination terminal determining section 119 in addition to the configuration of the client terminal 11 in the first exemplary embodiment. The client terminal 11' is also provided with an cipher session establishing section 121, a data enciphering section 123, a data deciphering section 124, and a message transmitting & receiving section 127 in place of the cipher session establishing section 111, the data enciphering section 113, the data deciphering section 114, and the message transmitting & receiving section 117 in the first exemplary embodiment.

The cipher session establishing section 121 performs a following process in addition to the process of the cipher session establishing section 111 in the first exemplary embodiment. The cipher session establishing section 121 establishes with the relay server 31', different cipher session use connections for the number of client terminals as the communication counter ends. If only information related to a single cipher session use connection can be exchanged in single transmission/reception of the cipher session establishment message 100, transmission/reception of the cipher session establishment message is repeated for the number of client terminals as the communication counter ends. If SSL is used for transmitting/receiving the cipher session establishment message 100, TCP connections are established for the number of client terminals as the communication counter ends with respect to the relay server 31', so that the cipher session establishment messages 100 are transmitted/received on the TCP connections.

The cipher session establishing section 121 also shares with the relay server 31', rules indicating certain cipher session use connections used for certain communication counter end. The cipher session establishing section 121 manages these rules as a connection correspondence table 106. The connection correspondence table 106 indicates a relationship of a cipher session use connection established between the client terminal 11' and the relay server 31' and a client terminal as a transfer destination (e.g., client terminal 21') to which data is transferred using this connection. The cipher session establishing section 121 notifies the connection correspondence table 106 to the relay server 31' before establishing the cipher session use connection with the relay server 31, or in transmitting/receiving the cipher session establishment message 100. Therefore, the above rules can be shared between the client terminal 11' and the relay server 31' before using the cipher session use connection. If a client A communicates with a client terminal B and a client terminal C, the client terminal A is assumed to establish two cipher session use connections X and Y with respect to the relay server 31'. The client terminal A is also assumed to use the cipher session use connection X for communication with the client terminal B, and use the cipher session use connection Y for communication with the client terminal C. In this case, the client terminal A notifies the connection correspondence table 106 in which the client terminal B as the communication destination corresponds to the cipher session use connection X to the relay server 31' and the connection correspondence table 106 in which the client terminal C as the communication destination corresponds to the cipher session use connection Y.

The destination terminal determining section 119 analyzes a data transferred from the application to perform address determination of the client terminal as a destination of the data, and the result is notified to the message transmitting & receiving section 127 and the data enciphering section 123 as destination terminal data 105.

The data enciphering section 123 performs a following process in addition to the process of the data enciphering section 113 in the first exemplary embodiment. The data enciphering section 123 obtains from the shared key managing section 112, the client shared key 101 corresponding to the destination terminal data 105 to be used for encipherment and MAC calculation of the data transferred from the application 118 in order to generate the client cipher data 202.

The message transmitting & receiving section 127 performs a following process in addition to the process of the message transmitting & receiving section 117 in the first exemplary embodiment. When the data communication message is transferred from the message producing section 115, the message transmitting & receiving section 127 obtains the destination terminal data 105 from the destination terminal determining section 119, and obtains the connection correspondence table 106 from the cipher session establishing section 121. The message transmitting & receiving section 127 selects an cipher session use connection corresponding to the destination terminal data 105 on the basis of the connection correspondence table 106, and transmits the data communication message 104 from a selected cipher session use connection.

The message transmitting & receiving section 127 also refers to the connection correspondence table 106 in response to reception of the data communication message 104 in order to specify a client terminal as a transmission source corresponding to an cipher session use connection used for receiving the message, and its information is notified to the data deciphering section 124 as a transmission source terminal data 109.

The data deciphering section 124 performs a following process in addition to the process of the data deciphering section 114 in the first exemplary embodiments. The data deciphering section 124 obtains from the shared key managing section 112, the client shared key 101 corresponding to the transmission source terminal data 109 obtained from the message transmitting & receiving section 127. Then, the data deciphering section 124 performs decipherment and MAC calculation of the client cipher data 202 transferred from the message analyzing section 116 by using the obtained client shared key 101.

If the shared key managing section 112 manages the client shared key 101 common to entire client terminals as communication targets, the destination terminal data 105 may not be notified to the data enciphering section 123. In this case, the transmission source terminal data 109 may not be notified to the data deciphering section 124 in the same manner. That is, if it is not necessary to distinguish the client shared keys used for generation or decipherment of the client cipher data 202, notification of the above information related to destination terminals and transmission source terminals is omitted.

Next, configuration and operation of the relay server 31' in the second exemplary embodiment will be described with reference to FIG. 10. The relay server 31' is provided with an cipher session establishing section 321 and message transfer section 322 in place of the cipher session establishing section 311 and the message transfer section 312 in the first exemplary embodiment.

The cipher session establishing section 321 performs a following process in addition to a process of the cipher session establishing section 311 in the first exemplary embodiment. The cipher session establishing section 321 shares, with client terminals with which cipher session use connections are established, rules that govern certain cipher session use connections used by the client terminals for communication with certain communication parties. For example, the cipher session establishing section 321 obtains the connection correspondence table 106 from the client terminals 11' and 21' before establishing or in establishing the cipher session use connections 13 and 23. The connection correspondence table 106 retained by the cipher session establishing section 321 exhibits correspondence made among a client terminal as the communication source, an cipher session use connection established with the client terminal as the communication source, a client terminal as the communication destination, and an cipher session use connection established with the client terminal of the transfer destination.

The connection correspondence table 106 will be described when the client terminal A communicates with the client terminal B and the client terminal C. The relay server 31' is assumed to establish the two cipher session use connections X and Y with the client terminal A, while establishing a cipher session use connection Z with the client terminal B and establishing a cipher session use connection W with the client terminal C. It is also assumed that the cipher session use connection X is used for communication between the client terminal A and client terminal B, and the cipher session use connection Y is used for communication between the client terminal A and client terminal C, while the cipher session use connection Z is used for communication between the client terminal B and client terminal A, and the cipher session use connection W is used for communication between the client terminal C and client terminal A. In this case, the client terminal A notifies to the relay server 31', the connection correspondence table 106 in which the client terminal B as the communication destination corresponds to the cipher session X, and the connection correspondence table 106 in which the client terminal C as the communication destination corresponds to the cipher session Y. The client terminal B notifies to the relay server 31', the connection correspondence table 106 in which the client terminal A as the communication destination corresponds to the cipher session 2. The client terminal C notifies to the relay server 31', the connection correspondence table 106 in which the client terminal A as the communication destination corresponds to the cipher session W. The relay server 31' produces correspondence relation of the client terminal A, the cipher session use connection X, the client terminal B, and the cipher session use connection Z on the basis of the connection tables 106 notified by the client terminals A and B, and manages the correspondence relation as a new connection correspondence table 106. Similarly, the relay server 31' produces correspondence relation of the client terminal A, the cipher session use connection Y, the client terminal C, and the cipher session use connection W on the basis of the connection correspondence tables 106 notified by the client terminals A and C, and manages the correspondence relation as a new connection correspondence table 106. These connection correspondence tables 106 are notified to the message transfer section 322.

The message transfer section 322 performs a following process in addition to the process of the message transmitting & receiving section 312 in the first exemplary embodiment. The message transfer section 322 determines a cipher session use connection used for receiving the data communication message 104 when the data communication message 104 is received from the client terminals 11' and 21'. Next, the message transfer section 322 transfers the data communication message 104 to the cipher session use connection for the transfer destination corresponding to the target cipher session use connection on the basis of the connection correspondence table 106 notified by the cipher session establishing section 321. In the above example, the data communication message 104 received from the cipher session use connection X (i.e., the message from the client terminal A to the client terminal B) is transferred to the cipher session use connection Z. The data communication message 104 received from the cipher session use connection Y (i.e., the message from the client terminal A to the client terminal C) is also transferred to the cipher session use connection W.

The above configuration allows the client terminals 11' and 21' to communicate with a plurality of client terminals via the relay server 31' Moreover, because the data communication message 104 in which the client cipher data 202 enciphered by the client shared key 101 is inserted in the cipher data field 107 is transmitted/received in the same manner as in the first exemplary embodiment, decipherment and re-encipherment are not required in the relay server 31'. That is, a process load in the relay server 31' can be reduced while allowing transmission/reception of data with secrecy between the client terminal 11' (or 21') and a plurality of client terminals. Communication among different private networks provided with highly functional firewalls can also be achieved.

Third Exemplary Embodiment

Figure 11:
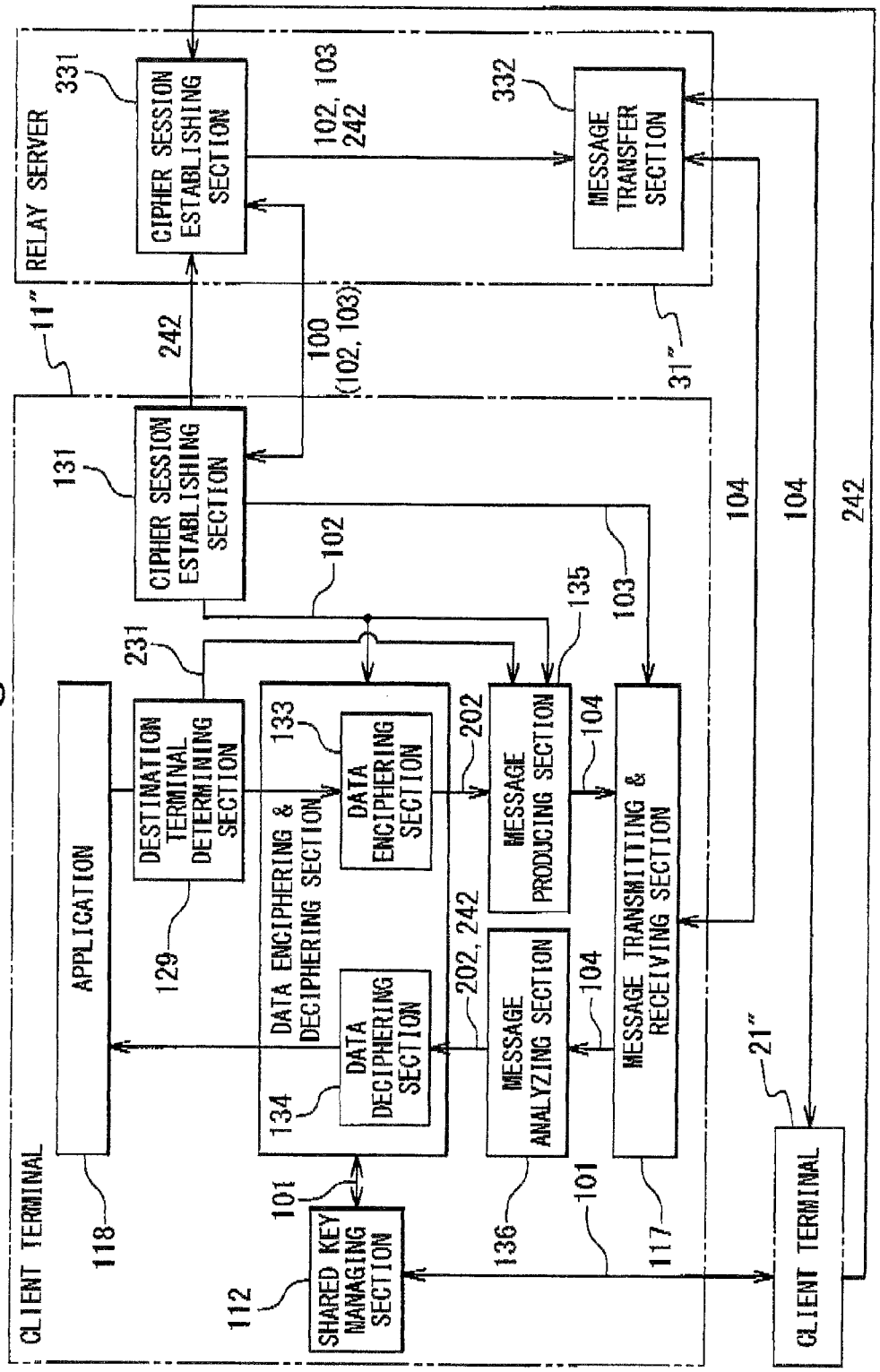
FIG. 11 is a block diagram showing a configuration of the communication system according to a third exemplary embodiment of the present invention.

Next, the communication system 1 according to a third exemplary embodiment of the present invention will be described with reference to FIGS. 11 to 13. In the related techniques, when one client terminal communicates with a plurality of client terminals via a relay server, a data is transmitted by using connections separately established for the respective client terminals. In the communication system 1 according to the present exemplary embodiment, a data (i.e., a data communication message) can be transmitted by using a single cipher session use connection established with a relay server in communication with a plurality of client terminals via the relay servers.

The communication system 1 according to the third exemplary embodiment is provided with client servers 11" and 21" and a relay server 31" in place of the client terminals 11 and 21 and the relay server 31 in the communication system 1 of the first exemplary embodiment shown in FIG. 1. The remaining configuration is the same as that of the first exemplary embodiment. The client servers 11" and 21" in the third exemplary embodiment communicate with a plurality of client terminals (not shown) (i.e. client terminals connected to other private networks) via the relay server 31". In the third exemplary embodiment, information to identify a destination client terminal (to be referred to as a destination terminal ID 231) is included in the data communication message 104 transmitted from the client terminals 11" and 21" to the relay server 31" after completion of transmitting/receiving the ciphers session establishment message 100 between the client terminals 11" and 21" and the relay server 31'. Therefore, even it the cipher session use connections 13 and 23 established between the client terminals 11" and 21" and the relay server 31" are a single connection, the client terminals 11" and 21" are allowed to communicate with a plurality of other client terminals (not shown) via the relay server 31'.

In the preset exemplary embodiment, a unique terminal ID is assigned to each of client terminals which use the same relay server 31", and each of the client terminals acquires a terminal ID assigned to its own terminal (i.e., a transmission source ID 242) and a terminal ID of a client terminal as a communication counter end (i.e., a destination terminal ID 231) by any method before starting communication.

Examples of the destination terminal ID 231 will be exhibited below. In the following examples, description will be given under the assumption that the client terminal 11" is a data transmission source and the client terminal 21" is a data transfer destination.

As a first example, there is a method in which the client terminal 11" acquires the connection data 103 of the cipher session use connection 23 established between the client terminal 21" as a communication counter end and the relay server 31" (information on a transmission source port number, destination IP address, and destination port number or the like in the relay server 31" if the cipher session use connection 23 is a TCP connection), so as to use the information as the destination terminal ID 231.

As a second example, there is a method in which a certain unique ID such as URI (Universal Resource Indicator) is assigned to each of the client terminals 11" and 21", and the client terminal 11" acquires a terminal ID of the communication counter end in advance before starting communication so that the acquired terminal ID is specified as the destination terminal ID 231.

As a method of acquiring the terminal ID of the communication counter end (i.e., the destination terminal ID 231), a terminal ID recorded in a medium such as a floppy (registered trademark) disk and a USB memory may be exchanged by using a physical method such as direct delivery, mailing, and electronic mails in which a terminal ID is attached may be exchanged. Furthermore, considered is a method of acquiring a terminal ID by accessing a separately provided a terminal ID management server which manages a plurality of terminal IDs as a directory (in a telephone directory format).

Configuration and operation details of the client terminals 11" and 21" according to the third exemplary embodiment will be described with reference to FIG. 11. Since the client terminals 11" and 21" are similarly configured, the configuration of the client terminal 11" will be described below.

The client terminal 11" according to the third exemplary embodiment is provided with a destination terminal determining section 129 in addition to the configuration of the client terminal 11 in the first exemplary embodiment. The client terminal 11" is also provided with an a cipher session establishing section 131, a data enciphering section 133, a data deciphering section 134, a message producing section 135, and a message analyzing section 136, in place of the cipher session establishing section 111, the data enciphering section 113, the data deciphering section 114, the message producing section 115, and the message analyzing section 116 in the first exemplary embodiment.

The cipher session establishing section 131 performs a following process in addition to the process of the cipher session establishing section 111 in the first exemplary embodiment. The cipher session establishing section 131 notifies a terminal ID of a client terminal of its own terminal (i.e., a transmission source terminal ID 242) to the relay server 31'. This allows the relay server 31" to determine certain cipher session use connections established with certain client terminal. As a method of notifying the transmission source terminal ID 242 to the relay server 31', transmission/reception of the cipher session establishment message 100 to/from the relay server 31" is completed and then the terminal ID is inserted in the cipher data field 107 of the data communication message 104 as the relay server readable data 201.

The destination terminal determining section 129 analyses a data transferred form the application 118 to perform address determination of the data, and acquires the destination terminal ID 231 corresponding to the client terminal as the transfer destination to notify the acquired terminal ID to the message producing section 135 and the data enciphering section 133.

The data enciphering section 133 performs a following process in addition to the process of the data enciphering section 113 in the first exemplary embodiment. The data enciphering section 133 acquires from the shared key managing section 112, the client shared key 101 corresponding to the destination terminal ID 231 to be used for encipherment and MAC calculation of data transferred from the application 118 and generates the client cipher data 202.

The message producing section 135 performs a following process in addition to the process of the message producing section 135 in the first exemplary embodiment. The message producing section 135 inserts the client cipher data 202 transferred from the data enciphering section 133 in the cipher data field 107, and inserts the destination terminal ID 231 transferred from the destination terminal determining section 129 in the cipher data field 107 as the relay server readable data 201. More specifically, the destination terminal ID 231 may be inserted in a plaintext without any changes, and may be inserted after performing encipherment and MAC calculation by the certain shared key (e.g., session key) exchanged with the relay server 31".

FIG. 12 shows an example of the data communication message 104 transmitted from the client terminal 11" to the relay server 31" in the present exemplary embodiment. Here, it is assumed that data is transferred by using the cipher session use connection 13 established by SSL between the client terminal 11" and the relay server 31". As shown in FIG. 12, the data communication message 104 according to the present exemplary embodiment includes the SSL record header 222 inserted as the cipher session header 203, the destination terminal ID 231 inserted as the relay server readable data 201, and arbitrary data 232 inserted as the client cipher data 202.

Moreover, the cipher data field 107 may further include arbitrary additional data 204 inserted in addition to the relay server readable data 201 and the client cipher data 202 as shown in FIG. 13. Therefore, the message producing section 135 is allowed to produce the data communication message 104 with the transmission source terminal ID 242 inserted in the cipher data field 107. In this case, the transmission source terminal ID 242 should be preferably inserted in a form readable by the client terminal 21" as the transfer destination.

The message analyzing section 136 performs a following process in addition to the process of the message analyzing section 116 in the first exemplary embodiment. The message analyzing section 136 extracts the transmission source terminal ID 242 sent to the data deciphering section 134 from the cipher data field 107 of the received data communication message 104.

The data deciphering section 134 performs a following process in addition to the process of the message analyzing section 114 in the first exemplary embodiment. The data deciphering section 134 acquires the client shared key 101 corresponding to the transmission source terminal ID 242 from the shared key managing section 112, to use for decipherment and MAC calculation of the client cipher data 202.

Since the transmission source terminal ID 242 for specifying a client terminal of a transmission source is thus inserted in the cipher data field 107, the client terminal 11" is allowed to decipher the client cipher data 202 even if the data is enciphered by using the client shared key 101 different for every communication counter end.

Next, configuration and operation of the relay server 31" according to the third exemplary embodiment will be described with reference to FIG. 11. The relay server 31" is provided with a cipher session establishing section 331 and a message transfer section 332 in place of the cipher session establishing section 311 and the message transfer section 312 in the first exemplary embodiment.

The cipher session establishing section 331 performs a following process in addition to the process of the cipher session establishing section 311 in the first exemplary embodiment. The cipher session establishing section 331 is notified of the transmission source terminal ID 242 corresponding to the client terminal 21" (or 11") as the transfer destination from the client terminal 11" (or 21").

The cipher session establishing section 331 notifies to the message transfer section 332, a correspondence of the transmission terminal ID 242, the connection data 103 of the cipher session use connection 13 (or 23) established with the client terminal 11 (or 21") on the basis of the transfer source terminal ID 242, and the cipher session header data 102. Therefore, the client terminal 11" (or 21") as the transmission source is made to correspond to the cipher session use connection 13 (or 23) established with the client terminal.

The message transfer section 332 performs a following process in addition to the process of the message transfer section 312 in the first exemplary embodiment. The message transfer section 332 refers to the destination terminal ID 231 included in the received data communication message 104, and uses the connection data 103 corresponding to this terminal ID to specify an cipher session use connection established with the destination client terminal. Then, contents of the cipher session header 203 are changed on the basis of the cipher session header data 102 corresponding to the destination terminal ID 231, so that the data communication message received by using the cipher session use connection is transferred.

If the client cipher data 202 is produced in a client terminal as the transfer destination by using the client shared key 101 which differs depending on a communication end, the message transfer section 332 may transfer the transmission source terminal ID 242 notified from the client terminal as the transmission source by inserting in the cipher data field 107 of the data communication message 104, as shown in FIG. 12. Therefore, the client terminal as the transfer destination is allowed to select the client shared key 101 used for decipherment of the client cipher data 202 of the received data communication message. If the transmission source terminal ID 242 is already inserted in the data communication message 104 received from the client terminal, the message transfer section 332 is not required to insert a transmission source terminal ID.

As described above, in the present exemplary embodiment, the destination terminal ID 231 which indicates a destination of the data communication message 104 is written in the cipher data field in a form readable by the relay server. Therefore, unlike the related technique, it is not necessary to decipher the entire cipher data field of the received data communication message in order to determine a transfer destination of the received data communication message by the relay server. In the present exemplary embodiment, the relay server 31" is capable of determining a transfer destination of the data communication message 104 without deciphering the cipher data field 107 entirely, so that a transfer load of the relay server can be reduced in comparison with the conventional technique.

The relay server 31" according to the present exemplary embodiment also determines a transfer destination based on the destination terminal ID 231 written in the received data communication message 104. This allows each of the client terminals 11" and 21" to communicate with one or more arbitrary client terminals by using a single cipher session use connection established with the relay server 31". Therefore, the number of cipher session use connections established between each of the client terminals 11" and 21" and the relay server 31" can be substantially small in comparison with that of the conventional technique. Accordingly, a load can be reduced in both the client terminals 11" and 21" and the relay server 31" in comparison with that of the conventional technique.

Moreover, because the destination terminal ID 231 and the transmission source terminal ID 242 are inserted into the cipher data field 107 of the data communication message 104 in the present exemplary embodiment, it can be seen from the firewalls 12 and 22 that the data communication message follows a normal cipher session format, to eliminate a possibility that communication is blocked off by the firewalls 12 and 21.

Furthermore, packet transfer destinations are determined by terminal IDs (i.e., the transmission source terminal ID 242 and the destination terminal ID 231) which identify individual client terminals in the present exemplary embodiment without using session identifiers (e.g., SPI of IPSec,) which identify a pair of client terminals to communicate. Therefore, an amount of information which needs to be held by the relay server 31" can be substantially reduced. Session identifiers are capable of uniquely identifying communication between two terminals. For example, a session identifier for communication between the client terminal A and the client terminal B is treated as being different from a session identifier for communication between the client terminal A and client terminal C. However, in a method of identifying transfer destinations based on the session identifiers, a relay server using session identifiers needs to hold $_nC_2$ session identifiers if the number of client terminals is n. In this case, the relay server needs to hold session identifiers for the number of combinations to select two terminals from client terminals of a maximum number of n. If n is 1000 for example, session identifiers of 499,500 are required. On the contrary, the relay server in the present exemplary embodiment may only hold n terminal IDs.

Also, in the same manner as the first exemplary embodiment, the data communication message 104 is transmitted/received in which the client cipher data 202 enciphered by using the client shared key 101 is inserted in the cipher data field 107, so that decipherment and re-encipherment are not required in the relay server 31'. That is, a process load in the relay server 31" can be reduced while allowing transmission/reception of data with secrecy between the client terminal 11" (21") and a plurality of client terminals. Communication among different private networks provided with highly functional firewalls can also be realized.

The destination terminal ID 242 used in the communication system 1 of the third exemplary embodiment is an ID which is made to correspond to a plurality of client IDs, i.e., a group ID, so that broadcast distribution is made possible in which a data is transmitted to a plurality of client terminals. At this time, an enciphering process load can also be reduced in the client terminals 11" and 21" by producing the client cipher data 202 using the client shared key 101 common to the client terminals as broadcast distribution destinations and a transmission source (to be referred to as a group key hereinafter). Broadcast distribution and the enciphering process by using the group key in the present exemplary embodiment will be described below.

An operation of producing the client cipher data 202 by using a group key will be described by using the client terminal 11" as an example.

The client shared key managing section 112 in the client terminal 11" and each of a plurality of client terminals as data transfer destinations acquires a group key by any means. As means adapted to acquire the group key by each of client terminals, a group key recorded in a medium such as a floppy (registered trademark) disk and a USB memory may be exchanged by using a physical means such as direct delivery, mailing, and electronic mails in which a shared key is attached may be exchanged. Further, a method is considered in which a group key management server which stores group keys is accessed to acquire the group key.

Usage of the group key may be limited in broadcast distribution, and the group key may be used for enciphering data transmitted to a single communication counter end. However, group keys have weaker security properties than individual keys in general, so that it is desirable to selectively use keys in such a manner as using individual keys for data transmitted to a single communication counter end and using group keys for data transmitted in broadcast distribution.

If the data field 107 of the data communication message 104 including a packet which includes layer-2 headers is transmitted from the client terminal 11" to a client terminal as a communication counter end, it is made possible to communicate as if the client terminals having connected to different private networks are connected to the same LAN. Furthermore, if such communication is made between the same client terminal 11" and a plurality of client terminals, communication can be realized as if the client terminal 11" and the plurality of the other client terminals are connected to the same LAN.

If the client terminal 11' transmits an ARP (Address Resolution Protocol) request packet and an SSDP (Simple Service Discovery) packet of UpnP (Universal Plug and Play) in the above case, broadcast distribution is caused due to broadcast addresses specified in destination MAC addresses of the packets.

The destination terminal determining section 139 of the client terminal 11" refers to a destination address of the layer-2 header of the packet transferred from the application 118, and notifies broadcast distribution to the data enciphering section 133 if the destination address is a broadcast address or a multicast address (i.e., broadcast distribution). At this time, the destination terminal determining section 139 notifies terminal IDs of a plurality of client terminals subjected to broadcast distribution as the destination terminal ID 242 to the message producing section 136.

If the data enciphering section 133 is notified of broadcast distribution from the destination terminal determining section 139, a group key managed by the shared key managing section 112 is used for encipherment and MAC calculation to generate the client cipher data 202.

Broadcast distribution is determined by the message producing section 136 if a plural number of the destination terminal IDs 242 are transferred from the destination terminal determining section 139, and a plural number of copies of the data communication message 104 are produced and the destination terminal IDs 242 are inserted into the respective cipher data fields 107.

The message analyzing section 137 in each of a plurality of client terminals which have received the above data communication message 104 notifies broadcast distribution to the data deciphering section 134 if the data communication message 104 received from the relay server 31" refers to broadcast distribution. The data deciphering section 134 is notified of broadcast distribution and performs decipherment and MAC calculation by using a group key managed by the shared key managing section 112.

If the client shared key 101 exchanged with each of client terminals (to be referred to as an individual key hereinafter) is used for enciphering data transferred form the application 118 in broadcast distribution with respect to a plurality of client terminals, a data enciphering process needs to be repeatedly performed for the number of client terminals as targets of the broadcast distribution. Therefore, a load applied to a client terminal as the transmission source is increased in accordance with the increase in the number of client terminals as the targets of the broadcast distribution, which makes it difficult to perform broadcast distribution for a multiple number of client terminals. However, according to the present exemplary embodiment, the client cipher data 202 is generated by a single enciphering process by using the client shared key 101 (i.e. group key) common to entire client terminals as the targets of the broadcast distribution. As a result, it is not necessary to execute an enciphering process for a plural number of times even if broadcast distribution is made for a multiple number of client terminals, reducing an enciphering process load in the client terminal of the transmission source.

Next, a case will be described where a group ID is used. The destination terminal determining section 139 of the client terminal 11" as the transmission source refers to a destination address of the layer-2 header of a packet transferred from the application 118, and notifies a group ID as the destination terminal ID 242 to the message producing section 136 if the destination address is a broadcast address or a multicast address (i.e. broadcast distribution).

The message transfer section 332 of the relay server 31" extracts the destination terminal ID 242 from the received data communication message 104. If the destination terminal ID 242 is a group ID at this time, the message transfer section 332 makes a copy of the data communication message 104 for the number of client terminals of the group on the basis of individual terminal IDs corresponding to the group ID. The message transfer section 332 also transfers the copied messages 104 to cipher session use connections corresponding to the terminal IDs.

According to the present exemplary embodiment, the data communication message 104 in which a group key is inserted as the destination terminal ID 242 is relayed by the relay server 31". Moreover, a copy of a message for the broadcast distribution is made on the client terminal side instead of the relay server 31". Therefore, a size of the data communication message 104 corresponding to the destination terminal ID 242 can be reduced while reducing a load in the relay server in comparison with a case that the relay server copies and transfers a data communication message in which a terminal ID for each of destination client terminals is included as a destination terminal ID.

Since the data communication message 104 in which the client cipher data 202 enciphered by the client shared key 101 is inserted in the cipher data field 107 is transmitted/received in the same manner as in the first exemplary embodiment, decipherment and re-encipherment are not required in the relay server 31' in the same manner as in the first exemplary embodiment. That is, the process load in the relay server 31" can be reduced while allowing transmission/reception of data with secrecy between the client terminal 11" (or 21") and a plurality of client terminals. Communication among different private networks provided with highly functional firewalls can also be realized.

Group keys may be used in combination with group IDs.

According to the present invention, a technique is provided to reduce a process load of a relay server which relays communication between a plurality of private networks provided with highly functional firewalls. Also, a technique is provided to increase the number of terminals to be accommodated by a relay server which relays communication between a plurality of private networks provided with the highly functional firewalls.

According to the present invention, a process load required for the relay server to relay communication with high secrecy between the plurality of private networks can be reduced. Reduction of a process load required for the relay server to relay communication between the plurality of private networks provided with highly functional firewalls can also be realized. It is further made possible to increase the number of terminals to be accommodated by the relay server which relays communication between the plurality of private networks provided with the highly functional firewalls.

Although exemplary embodiments of the present invention have been described above, detailed configurations are not limited to those of the above exemplary embodiments, and modification and changes to be made in a range without exceeding a scope of the present invention are also included in the present invention.

What is claimed is:

1. A client terminal comprising:
a cipher session establishing section configured to establish a cipher session use connection between said client terminal as a source client terminal and a relay server by transmitting/receiving a cipher session establishment message between said source client terminal and said relay server, and to notify header information contained in a cipher session header to said relay server;
a shared key managing section configured to hold a client shared key with a destination client terminal;
a data enciphering section configured to perform an encipherment of a data from an application by using said client shared key, and a Message Authentication Code (MAC) calculation of said data, by using said client shared key and to output the performing result as an encrypted client cipher data and at least partially encrypted cipher session header;
a message producing section configured to insert said encrypted client cipher data into a cipher data field and the at least partially encrypted cipher session header into the non-cipher data field to produce a data communication message including the cipher data field in which said client cipher data is inserted and the non-cipher data field in which said at least partially encrypted cipher session header containing said header information is inserted, wherein said message producing section produces the data communication message with a terminal ID of the destination client terminal, the terminal ID being in a format readable by said relay server without decoding the encrypted cipher data field of the data communication message; and
a transmitting section configured to transmit said data communication message destined to said destination client terminal to said relay server by using said cipher session use connection,
wherein the client terminal is connected to the relay server via a firewall, the firewall being set to allow two-directional communication using the cipher session established with the relay server for the source client terminal to transmit and the destination client terminal to receive the data by the relayed data communication message, the firewall monitoring the cipher session establishment message to confirm a completion of transmitting/receiving the cipher session establishment message, whether the data communication message is transmitted/received between the terminals on established cipher session connections, and whether the data communication message follows a defined format in order to determine whether to block the data communication message.

2. The client terminal according to claim 1, wherein said message producing section inserts the terminal ID of said destination client terminal as the destination terminal ID into said cipher data field in the form readable, without decoding the encrypted cipher data field of the data communication message, by said relay server to produce said data communication message.

3. The client terminal according to claim 2, wherein said source client terminal is assigned with a source terminal ID,
said data enciphering section performs the encipherment of said data and/or the MAC (Message Authentication Code) calculation of said data by using one of said client shared keys managed by said shared key managing section and corresponding to said destination terminal ID, and
said message producing section inserts said source terminal ID of said source client terminal in said cipher data field as a source terminal ID to produce said data communication message.

4. The client terminal according to claim 2, wherein said keyed managing section holds a group key common to a plurality of said destination client terminals,
said data enciphering section performs the encipherment of the data and/or the MAC calculation of the data by using said group key, said message producing section inserts the plurality of terminal IDs of said plurality of destination client terminals in said cipher data fields of replica messages of said data communication message as destination terminal IDs, the plurality of destination client terminal IDs in the format readable by said relay server without decoding the encrypted cipher data field of the data communication message, and said transfer section transfers said replica messages for said plurality of destination client terminals to said relay server by using said cipher session use connection.

5. The client terminal according to claim 2, wherein said shared key managing section holds a group key common to a plurality of said destination client terminals, said data enciphering section performs the encipherment of the data and/or the MAC calculation of the data by using said group key, said message producing section inserts a group terminal ID allocated to said plurality of destination client terminals in said cipher data field of said data communication message as the destination terminal ID, and said transfer section transfers said data communication message for said plurality of destination client terminals to said relay server by using said cipher session use connection.

6. The client terminal according to claim 1, further comprising:

a receiving section configured to receive said data communication message transmitted from said destination client terminal through said relay server;

a message analyzing section configured to extract a data enciphered or a data used for MAC calculation by using said client shared key with said source client terminal from the cipher data field of said data communication message; and a data deciphering section configured to decipher the extracted data and/or calculate MAC of the extracted data.

7. The client terminal according to claim 6, wherein when said cipher session establishment message transmitted from said source client terminal is contained in said cipher data field of said data communication message received from said relay server, said message analyzing section transfers said cipher session establishment message to said shared key managing section, and said shared key managing section acquires said client shared key with said source client terminal based on said cipher session establishment message corresponding to said cipher session establishment message transferred from said message analyzing section.

8. The client terminal according to claim 7, wherein said message analyzing section extracts a source terminal ID contained in said cipher data field of said data communication message, and said data deciphering section performs decipherment of the data extracted by said message analyzing section and/or calculation of MAC of the extracted data by using a client shared key managed by said shared key managing section and corresponding to said source terminal ID extracted by said message analyzing section.

9. The client terminal according to claim 7, wherein said message analyzing section notifies to said data deciphering section that said received data communication message is a broadcast communication, and in response to the notice from said message analyzing section, said data deciphering section perform the decipherment of the extracted data by said message analyzing section by using a group key, common to said plurality of destination client terminals, of the client shared keys managed by said shared key managing section, and/or the calculation of MAC of the extracted data.

10. The client terminal according to claim 6, wherein said message analyzing section compares the MAC contained in said data communication message received from said relay server and the MAC contained in said data communication message and calculated by using a session key which is acquired from said relay server in the establishment of said cipher session use connection, to carry out authentication of said data communication message.

11. The client terminal of claim 1, wherein the firewall further authorize transmission/reception of the cipher session establishment message when the cipher session establishment message is started from first and second private networks corresponding to the source and destination client terminals and to the global network.

12. A relay server which relays communication between client terminals, comprising:

a cipher session establishing section configured to establish a cipher session use connection with each of a plurality of client terminals by transmitting/receiving a cipher session establishment message to/from each of said plurality of client terminals, and to acquire header information to be contained in a cipher session header from each of said plurality of client terminals; and a message transfer section configured to transmit/receive a data communication message to/from each of said plurality of client terminals by using said cipher session use connection, wherein said data communication message includes an encrypted cipher data field which includes an encrypted client cipher data enciphered by using a client shared key shared by said plurality of client terminals, and a non-cipher data field which includes an at least partially encrypted cipher session header which contains said header information and a terminal ID of a destination client terminal in a format readable by said relay server without decoding the encrypted cipher data field of the data communication message, and said message transfer section converts said at least partially encrypted cipher session header contained in said non-cipher data field of said data communication message transmitted from any of said plurality of client terminals into a cipher session header corresponding to one of said plurality of client terminals as a transmission destination of said data communication message and transmits said data communication message which has the converted cipher session header, to said client terminal as the transmission destination, said relay server not deciphering said cipher data field and not performing MAC calculation to the client cipher data in the cipher data field in receiving and transmitting said data communication message.

13. The relay server according to claim 12, wherein said cipher session establishing section notifies correspondence relation between a terminal ID notified from each of said plurality of client terminals and said cipher session use connection to said message transfer section, and said message transfer section uses said cipher session use connection corresponding to a same terminal ID as the destination terminal ID which is contained in said cipher data field of said data communication message based on the correspondence relation for transmission of said data communication message.

14. A communication system comprising:
first and second private networks, the first and second private networks being different from each other;
a global network;
a relay server located in the global network;
first and second client terminals each having a respective terminal ID;
the first client terminal connected to the first private network via a first firewall and a second client terminal connected to the second private network via a second firewall, the first and second terminals being computers,
the first and second client terminals transmitting and receiving data between each other via the relay server by cipher using a session establishment message to establish a cipher session with the relay server so that the first client terminal, serving as a source client terminal, transmits and the second client terminal, serving as a destination client terminal, receives data by a data communication message relayed by the relay server, the cipher session including cipher session connections between each of the first and second client terminals and the relay server,
each of the first and second firewalls being set to allow two-directional communication using the cipher session established with the relay server for the first client terminal to transmit and the second client terminal to receive the data by the relayed data communication message, each of the first and second firewalls monitoring the cipher session establishment message to confirm a completion of transmitting/receiving the cipher session establishment message, whether the data communication message is transmitted/received between the terminals on the cipher session connections, and whether the data communication message follows a defined format in order to determine whether to block the data communication message;
each of the first and second client terminals comprising
i) a cipher session establishing section configured to establish a cipher session use connection between the source client terminal and the relay server by transmitting/receiving a cipher session establishment message between said source client terminal and said relay server, and to notify header information contained in a cipher session header to said relay server, the cipher session establishing section exchanging with the destination client terminal a client shared key,
ii) a shared key managing section configured to hold the client shared key with the destination client terminal,
iii) a data enciphering section configured to perform an encipherment of data from an application by using both said client shared key and a Message Authentication Code (MAC) calculation of said data, by using said client shared key, and to output the performing result as an encrypted client cipher data and at least partially encrypted cipher session header,
iv) a message producing section configured to produce the data communication message comprised of a cipher data field and a non-cipher data filed, by inserting i) said encrypted client cipher data in the cipher data field, and ii) the at least partially encrypted cipher session header in the non-cipher data field in which said at least partially encrypted cipher session header contains said header information including the terminal ID of the destination client terminal,
wherein said message producing section produces the data communication message with the terminal ID of the destination client terminal, the terminal ID being in a format readable by said relay server without decoding the encrypted cipher data field of the data communication message, and
v) a transmitting section configured to transmit said data communication message destined for said destination client terminal to said relay server over the cipher session connections by using said cipher session use connection, and
the relay server comprising
i) a cipher session establishing section configured to establish the cipher session use connection with each of the source and destination client terminals by transmitting/receiving the cipher session establishment message to/from each of the source and destination client terminals, and to acquire the header information to be contained in the cipher session header from the source client terminal, and
ii) a message transfer section configured to transmit/receive the data communication message to/from each of the source and destination client terminals by using said cipher session use connection, and
said message transfer section determines the terminal ID of the destination client terminal by converting said at least partially encrypted cipher session header contained in said non-cipher data field of said data communication message transmitted into the cipher session header corresponding to the destination client terminal and transmits said data communication message to the destination client terminal via said cipher session connections between each of the first and second client terminals and the relay server, said relay server not deciphering said cipher data field and not performing MAC calculation to the client cipher data in the cipher data field.

15. The communication system of claim 14, wherein said firewalls further authorize transmission/reception of the cipher session establishment message when the cipher session establishment message is started from the first and second private networks to the global network.

* * * * *